US010095203B2

United States Patent
Lee et al.

(10) Patent No.: US 10,095,203 B2
(45) Date of Patent: Oct. 9, 2018

(54) ELECTRONIC DEVICE

(71) Applicant: LG ELECTRONICS INC., Seoul (KR)

(72) Inventors: Haklim Lee, Seoul (KR); Jaehyuk Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 14/933,480

(22) Filed: Nov. 5, 2015

(65) Prior Publication Data

US 2017/0060110 A1    Mar. 2, 2017

(30) Foreign Application Priority Data

Aug. 24, 2015  (KR) .................. 10-2015-0118709

(51) Int. Cl.
  *G05B 15/02*  (2006.01)
  *G06F 1/16*  (2006.01)
  (Continued)

(52) U.S. Cl.
  CPC .............. *G05B 15/02* (2013.01); *G06F 1/163* (2013.01); *G06F 1/1632* (2013.01); *G06F 3/038* (2013.01); *G06F 3/0362* (2013.01); *G06F 3/04847* (2013.01); *H01H 19/00* (2013.01); *G06F 2203/0384* (2013.01)

(58) Field of Classification Search
  CPC ....... G05B 15/02; G06F 1/163; G06F 1/1632; G06F 2203/0384; G06F 3/0362; G06F 3/038; G06F 3/04847; H01H 19/00
  See application file for complete search history.

(56) References Cited

U.S. PATENT DOCUMENTS

| 7,375,511 B2 | 5/2008 | Kang |
| 7,417,422 B2 | 8/2008 | Kang |
| (Continued) | | |

FOREIGN PATENT DOCUMENTS

| KR | 20-0409445 | 2/2006 |
| KR | 10-2009-0022096 | 3/2009 |
| (Continued) | | |

OTHER PUBLICATIONS

International Search Report dated Jun. 3, 2016 issued in Application No. PCT/KR2015/009564.

*Primary Examiner* — Abdelmoniem Elamin
(74) *Attorney, Agent, or Firm* — KED & Associates, LLP

(57) ABSTRACT

Electronic devices are disclosed. According to the present invention, an electronic device may comprise a base; a rotor rotating on the base; a first magnetic body positioned at a center of rotation of the rotor; a second magnetic body having a different polarity from the first magnetic body, facing the first magnetic body, and positioned in the base; a first plurality of magnetic bodies positioned around the second magnetic body and having at least two different polarities; a hall sensor embedded in the rotor and sensing a change in magnetic property provided from the first plurality of magnetic bodies according to the rotation of the rotor; a wireless communication unit embedded in the rotor or the base; and a controller embedded in the rotor or the base and transmitting information obtained by the hall sensor through the wireless communication unit.

20 Claims, 37 Drawing Sheets

(51) Int. Cl.
    *G06F 3/038*     (2013.01)
    *H01H 19/00*     (2006.01)
    *G06F 3/0362*    (2013.01)
    *G06F 3/0484*    (2013.01)

(56) References Cited

U.S. PATENT DOCUMENTS

| | | | | |
|---|---|---|---|---|
| 7,425,825 | B2 | 9/2008 | Kang | |
| 7,468,603 | B2 | 12/2008 | Kang et al. | |
| 8,044,826 | B2 * | 10/2011 | Yoo | G06F 3/0338 |
| | | | | 341/20 |
| 8,106,733 | B2 * | 1/2012 | Nakasuji | H01H 36/0066 |
| | | | | 219/457.1 |
| 8,130,123 | B2 * | 3/2012 | Inoue | G01D 5/145 |
| | | | | 324/207.25 |
| 8,143,981 | B2 * | 3/2012 | Washizu | H01H 25/002 |
| | | | | 335/205 |
| 8,184,023 | B2 * | 5/2012 | Naka | G06F 3/0362 |
| | | | | 341/20 |
| 8,358,278 | B2 | 1/2013 | Lim et al. | |
| 8,536,965 | B2 * | 9/2013 | Yoshida | G06F 3/0338 |
| | | | | 335/205 |
| 9,093,237 | B2 * | 7/2015 | Bondar | F24C 7/083 |
| 2003/0095096 | A1 | 5/2003 | Robbin et al. | |
| 2004/0017732 | A1 * | 1/2004 | Kishida | A63B 71/0605 |
| | | | | 368/2 |
| 2008/0211488 | A1 | 9/2008 | Kang | |
| 2009/0121905 | A1 * | 5/2009 | Griffin, Jr. | G08C 17/02 |
| | | | | 341/35 |
| 2010/0225309 | A1 * | 9/2010 | Takahashi | G01D 5/145 |
| | | | | 324/207.25 |
| 2012/0197345 | A1 | 8/2012 | Staller | |

FOREIGN PATENT DOCUMENTS

| | | |
|---|---|---|
| KR | 10-2015-0025206 | 3/2015 |
| KR | 10-2015-0081169 | 7/2015 |

* cited by examiner

ELECTRONIC DEVICE

This application claims the benefit of Korean Patent Application No. 10-2015-0118709 filed on Aug. 24, 2015, the entire contents of which are incorporated herein by reference for all purposes as if fully set forth herein.

BACKGROUND OF THE INVENTION

Field of the Invention

The present invention relates to electronic devices. More specifically, the present invention relates to electronic devices that may control other electronic devices or systems.

Discussion of the Related Art

The progress of information technology led to development of information devices that may exchange information through wired/wireless communications.

Recently, Internet-of-Things (IoT) technologies attract lots of attention and vigorous research is underway for technology that may allow a system to control other systems. What is demanded is controllers that enable one system to other multiple systems or that may control a plurality of systems all together.

SUMMARY OF THE INVENTION

To achieve the foregoing or other objects, according to an aspect of the present invention, there is provided an electronic device may comprise a base; a rotor rotating on the base; a first magnetic body positioned at a center of rotation of the rotor; a second magnetic body having a different polarity from the first magnetic body, facing the first magnetic body, and positioned in the base; a first plurality of magnetic bodies positioned around the second magnetic body and having at least two different polarities; a hall sensor embedded in the rotor and sensing a change in magnetic property provided from the first plurality of magnetic bodies according to the rotation of the rotor; a wireless communication unit embedded in the rotor or the base; and a controller embedded in the rotor or the base and transmitting information obtained by the hall sensor through the wireless communication unit.

According to another aspect of the present invention, the electronic device may further comprise a third magnetic body positioned around the first magnetic body, facing at least one of the first plurality of magnetic bodies, and having a different magnetic property from at least one of the first plurality of magnetic bodies.

According to another aspect of the present invention, the electronic device may further comprise a third magnetic body positioned around the first magnetic body, facing at least one of the first plurality of magnetic bodies, and having the same magnetic property as at least one of the first plurality of magnetic bodies.

According to another aspect of the present invention, the electronic device may further comprise a second plurality of magnetic bodies positioned around the first magnetic body, facing at least two of the first plurality of magnetic bodies, and having the same magnetic property as at least one of the first plurality of magnetic bodies and a different magnetic property from at least another of the first plurality of magnetic bodies.

According to another aspect of the present invention, the rotor may be shaped as a pebble, and the base may be shaped as a shell having a concave surface, and the rotor may be placed on the concave surface of the base.

According to another aspect of the present invention, the electronic device may further comprise a rotational shaft externally extending from a part of the base facing the rotor; and a rotational hole formed on the rotor facing the base, wherein the rotational shaft fitted into the rotational hole.

According to another aspect of the present invention, the electronic device may further comprise a rotational shaft externally extending from a part of the rotor facing the base; and a rotational hole formed on the base facing the rotor, wherein the rotational shaft fitted into the rotational hole.

According to another aspect of the present invention, the first magnetic body may be positioned at the rotational shaft, and the second magnetic body may be positioned at the rotational hole.

According to another aspect of the present invention, the electronic device may further comprise a sync extending from an end of the rotational shaft in an outside direction of a diameter of the rotational shaft and formed asymmetrically; and a sync hole depressed from a periphery of an upper end of the rotational hole in an inside direction of a diameter of the rotational hole, the sync hole formed asymmetrically to match the sync.

According to another aspect of the present invention, the electronic device may further comprise a sound unit embedded in the rotor, wherein the sound unit includes a housing and a sounder provided in the housing and moved in the housing by a change in magnetic property of the first plurality of magnetic bodies according to the rotation of the rotor and having different magnetic properties.

According to another aspect of the present invention, the sounder may include a plurality of magnetic bodies having different polarities.

According to another aspect of the present invention, the sounder may include a first cube having a magnetic property and a second cube having a magnetic property different from the first cube.

According to another aspect of the present invention, the sounder may include a ball having a magnetic property and a cube having a magnetic property different from the ball.

According to another aspect of the present invention, the electronic device may further comprise a sound unit embedded in the rotor, wherein the sound unit includes a housing, a sounder embedded in the housing, having a magnetic property, and moved in the housing by a change in magnetic property of the first plurality of magnetic bodies according to the rotation of the rotor, and a pivot lever having a side pivotally connected to the housing and another side fixed to the sounder.

According to another aspect of the present invention, the electronic device may further comprise a plurality of terminals provided at a part of the rotor facing the base; and a terminal provided at a part of the base facing the rotor and contacting at least one of the plurality of terminals according to the rotation of the rotor, wherein the controller is configured to determine an external system connected with the wireless communication unit by information obtained from a terminal resistance of any one of the plurality of terminals.

According to another aspect of the present invention, the controller may be configured to determine the external system connected with the wireless communication unit when a change in the terminal resistance of any one of the plurality of terminals lasts a predetermined time or more.

According to another aspect of the present invention, the electronic device may further comprise a display unit provided in the rotor and forming a surface of the rotor.

According to another aspect of the present invention, the controller may be configured to activate at least a portion of the display unit by the rotation of the rotor.

According to another aspect of the present invention, the controller may be configured to display a dot or a line on the display unit in an opposite direction of a direction in which the rotor rotates.

According to another aspect of the present invention, the rotor may include an inner covered by the base and an outer exposed to an outside of the base, the outer having an asymmetrical shape.

According to an embodiment of the present invention, there may be an electronic device that may adjust other systems.

According to an embodiment of the present invention, there may be provided an electronic device that may easily adjust a system by the rotation of a rotor.

According to an embodiment of the present invention, there may be provided an electronic device easy to attach or detach.

According to an embodiment of the present invention, there may be an electronic device that may identify the rotation of a rotor by a sound or light.

According to an embodiment of the present invention, there may be provided an electronic device that may identify the rotation of a rotor by a shape.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
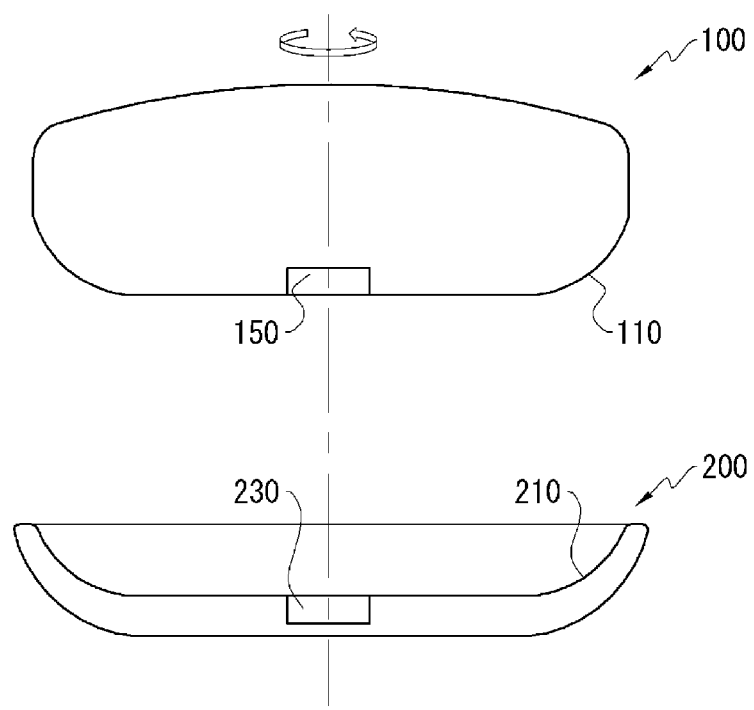
FIGS. 1 to 5 are views illustrating examples of cross sections of an electronic device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to "or" being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

As used herein, the electronic device may include a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, a smartglass-type terminal, or a head-mounted display (HMD)), a digital TV, a desktop computer, and a digital signage device.

FIGS. 1 to 5 are views illustrating examples of cross sections of an electronic device according to an embodiment of the present invention. FIGS. 1 to 5 show a rotor 100, a base 200, and magnetic bodies 150 and 230.

Referring to FIG. 1, the rotor 100 may make a coupling with the base 200. Or, the rotor 100 may pair with the base 200. The rotor 100 may spin on the base 200. "The rotor 100 spins on the base 200" means that the rotor 100 may rotate while placed on the base 200. In other words, the coupling or pairing between the rotor 100 and the base 200 means that the base 200 does not restrict the rotation of the rotor 100. The rotor 100 may have inclined surfaces at left and right sides of a lower surface or at the periphery thereof. The inclined surfaces 100 may be formed as the lower surface of the rotor 100 is tapered or rounded. The base 200 may have guiding surfaces 210 at left and right sides of an upper surface or at the periphery thereof. The guiding surfaces 210 may be formed as the base 200 is overall shaped as a shell or plate. The guiding surfaces 210 may face the inclined surfaces 110. As the rotor 100 spins on the base 200, the guiding surfaces 210 may rub against the inclined surfaces 110 to keep the rotor 100 spinning.

Meanwhile, the coupling or pairing between the rotor 100 and the base 200 might not remain permanent. This means that the rotor 100 may be free to be coupled or decoupled on the base 200. In some cases, the rotor 100 may remain independently from the base 200. In other cases, the rotor 100 may couple or pair with the base 200 when placed on the base 200.

The magnetic bodies may be provided in the rotor 100 or the base 200. The magnetic bodies may be provided for coupling or pairing between the rotor 100 and the base 200. The magnetic body 150 in the rotor 100 and the magnetic body 230 in the base 200 may have different polarities. For example, when the magnetic body 150 of the rotor 100 has an N polarity, the magnetic body 230 of the base 200 may have an S polarity. The magnetic body 150 of the rotor 100 may be a first magnetic body, and the magnetic body 230 of the base 200 may be a second magnetic body. The polarities of the magnetic body 150 and the magnetic body 230 may turn opposite from each other.

The first magnetic body 150 may be positioned on the center of rotation of the rotor 100. "The first magnetic body 150 is positioned on the center of rotation of the rotor 100" means that the rotor 100 may spin around the center of the first magnetic body 150. The first magnetic body 150 may be positioned adjacent to the base 200 when a coupling or pairing is made between the rotor 100 and the base 200. Being positioned adjacent to the base 200 means that the magnetic force of the first magnetic body 150 may influence the base 200.

The second magnetic body 230 may be positioned substantially at the center of the base 200. The center of the base 200 may be consistent with the center of rotation of the rotor 100. In another point of view, when the base 200 couples or pairs with the rotor 100 and spins, the center of the base 200 may be the center of rotation of the base 200. The second magnetic body 230 may have a different polarity from the first magnetic body 150. Accordingly, when the rotor 100 couples or pairs with the base 200, the rotor 100 may spin on the base 200 and the coupling or pairing may be maintained.

Figure 2:
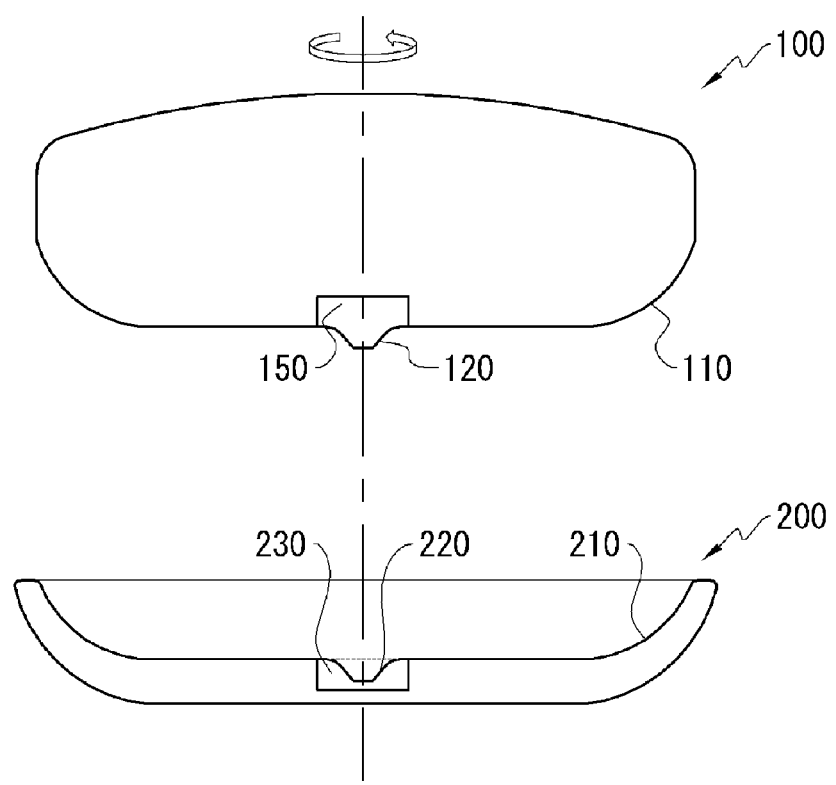

An embodiment of the present invention is described with reference to FIG. 2, wherein the same reference numerals are used to refer to the same elements given in FIG. 1 whose detained description is skipped.

The rotor 100 may have a protrusion 120. The protrusion 120 may be formed at the center of rotation of the rotor 100. The protrusion 120 may be formed on the surface of the rotor 100 facing the base 200. The surface of the rotor 100 may be a lower surface of the rotor 100.

The base 200 may have a depression 220. The depression 220 may be formed in the base 200 corresponding to the center of rotation of the rotor 100. In other words, the depression 220 may be formed in the base 200 so that the protrusion 120 is fitted when the rotor 100 and the base 200 couple or pair. The depression 220 may be formed in the surface of the base 200 facing the rotor 100. The surface of the base 200 may be an upper surface of the base 200.

The first magnetic body 150 may be positioned adjacent to the protrusion 120, and the second magnetic body 230 may be positioned adjacent to the depression 220. Alternatively, the first magnetic body 150 may be located at the center of rotation of the rotor 100 while the second magnetic body 230 is located on the base 200 to face the first magnetic body 150.

Accordingly, when the rotor 100 couples or pairs with the base 200, the rotor 100 may spin on the base 200 and the coupling or pairing may be maintained. The protrusion 120 may be referred to as a rotational shaft, and the depression 220 may be referred to as a rotational hole.

Figure 3:
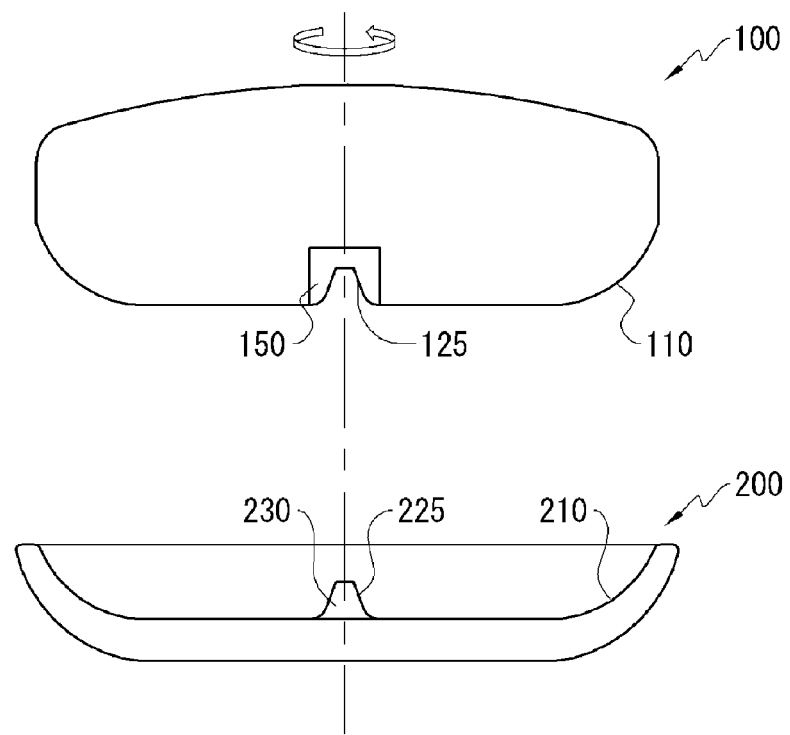

An embodiment of the present invention is described with reference to FIG. 3, wherein the same reference numerals are used to refer to the same elements given in FIG. 1 whose detained description is skipped.

The rotor 100 may have a depression 125. The depression 125 may be formed at the center of rotation of the rotor 100. The depression 125 may be formed on the surface of the rotor 100 facing the base 200. The surface of the rotor 100 may be a lower surface of the rotor 100.

The base 200 may have a protrusion 225. The protrusion 225 may be formed in the base 200 corresponding to the center of rotation of the rotor 100. In other words, the protrusion 225 may be formed in the base 200 so that the protrusion 225 is fitted when the rotor 100 and the base 200 couple or pair. The protrusion 225 may be formed in the surface of the base 200 facing the rotor 100. The surface of the base 200 may be an upper surface of the base 200.

The first magnetic body 150 may be positioned adjacent to the depression 125, and the second magnetic body 230 may be positioned adjacent to the protrusion 225. Alternatively, the first magnetic body 150 may be located at the center of rotation of the rotor 100 while the second magnetic body 230 is located on the base 200 to face the first magnetic body 150.

Accordingly, when the rotor 100 couples or pairs with the base 200, the rotor 100 may spin on the base 200 and the coupling or pairing may be maintained. The protrusion 225 may be referred to as a rotational shaft, and the depression 125 may be referred to as a rotational hole.

Figure 4:
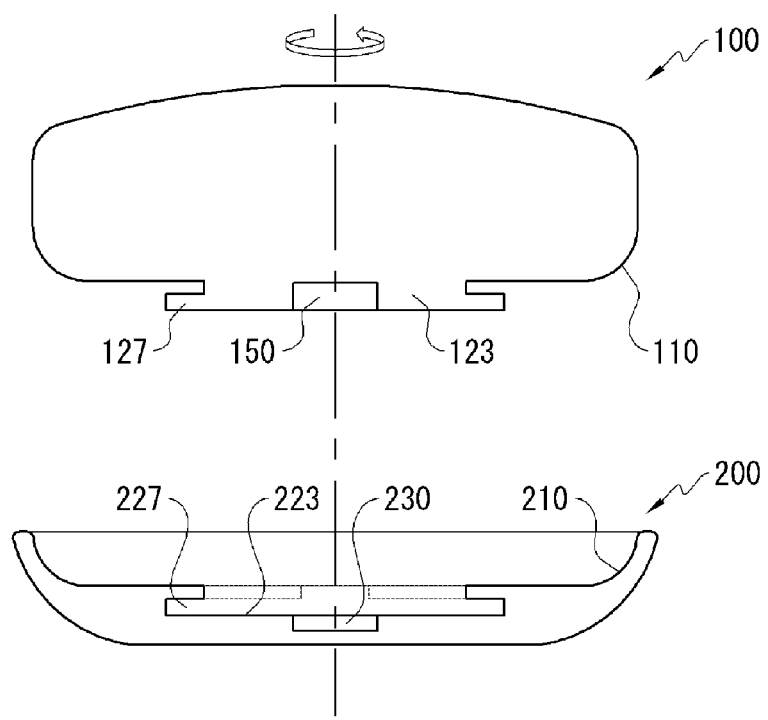
Figure 5:
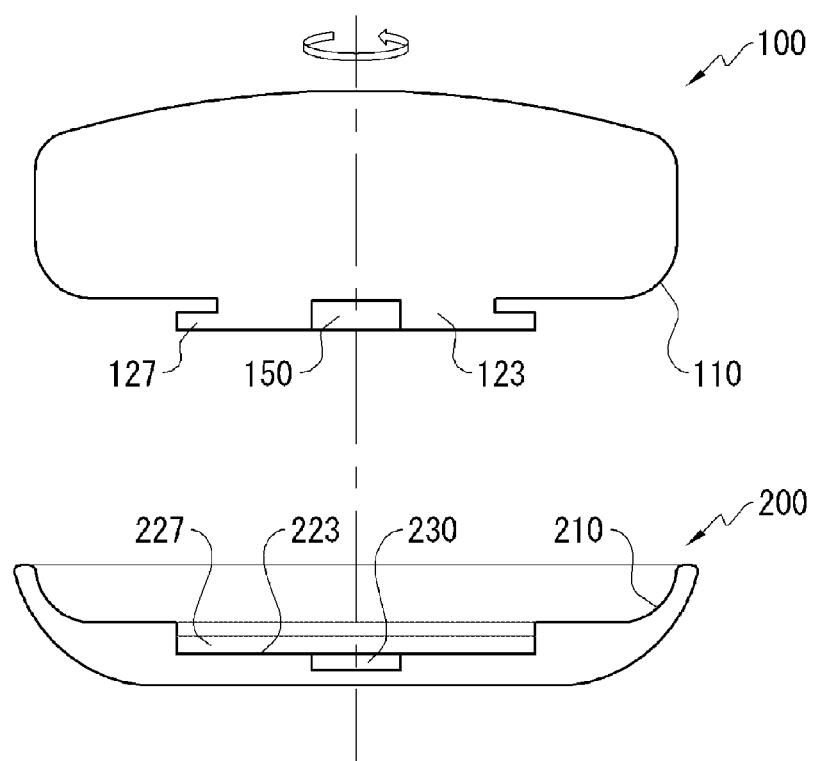

FIG. 4 illustrates an example of a cross section of a rotor and base, and FIG. 5 illustrates an example of a cross section of the rotor and base when the base has spun at a predetermined angle.

Referring to FIG. 4, the rotor 100 may have a rotational shaft 123. The rotational shaft 123 may extend from a lower surface of the rotor 100. The rotational shaft 123 may be shaped as a cylinder and may extend from the rotor 100. The rotational shaft 123 may have a jaw 127 extending from both sides of a lower portion of the rotor 100. Both sides of the lower portion of the rotor 100 may mean the periphery of the lower portion of the rotor 100. The jaw 127 may be formed by attaching a disc-shaped plate to the bottom of the rotational shaft 123. Meanwhile, the jaw 127 may be integrally formed with the rotational shaft 123.

The base 200 may have a rotational hole 223 to which the rotational shaft 123 fits. The top of the base 200 may be depressed to form the rotational hole 223. The base 200 may have a hooking hole 227 that extends inward of the base 200 from both sides of the rotational hole 223. "Both sides of the rotational hole 223" may mean the bottom of the rotational hole 223 or the periphery of an upper portion of the base 200. The joint of the jaw 127 and the hooking hole 227 is described with reference to FIG. 5.

Referring to FIG. 5, the rotor 100 may be positioned on the base 200. The center of rotation of the rotor 100 may be aligned with the center of rotation of the base 200. The rotational shaft 123 of the rotor 100 may be plugged into the rotational hole 223 of the base 200. The angle or position where the rotational shaft 123 of the rotor 100 may be plugged into the rotational hole 223 of the base 200 may be limited. This means that, referring to FIG. 4, the rotational shaft 123 cannot be plugged into the rotational hole 223 of the base 200, and that, referring to FIG. 5, the rotational shaft 123 of the rotor 100 may be plugged into the rotational hole 223 of the base 200. That may mean that the rotational shaft 123 of the rotor 100 may be plugged into the rotational hole 223 of the base 200 in the position shown in FIG. 5, and when turned, it may be left in the position shown in FIG. 4. In the position shown in FIG. 4, the rotor 100 may rotate on the base 200 while prevented from releasing out of the base 200 by the jaw 127 and the hooking hole 227. Meanwhile, the rotation of the rotor 100 on the base 200 may lead to a change in position of the rotor 100 from the position shown in FIG. 4 to the position shown in FIG. 5. In this case, the rotor 100 may release from the base 200. The first magnetic body 150 and the second magnetic body 230 may prevent the rotor 100 from easily releasing from the base 200 in the position shown in FIG. 5. That is, the first magnetic body 150 and the second magnetic body 230, after the rotor 100 couples or pairs with the base 200, may prevent the rotor 100 from releasing from the base 200 while in rotation.

Figure 6:
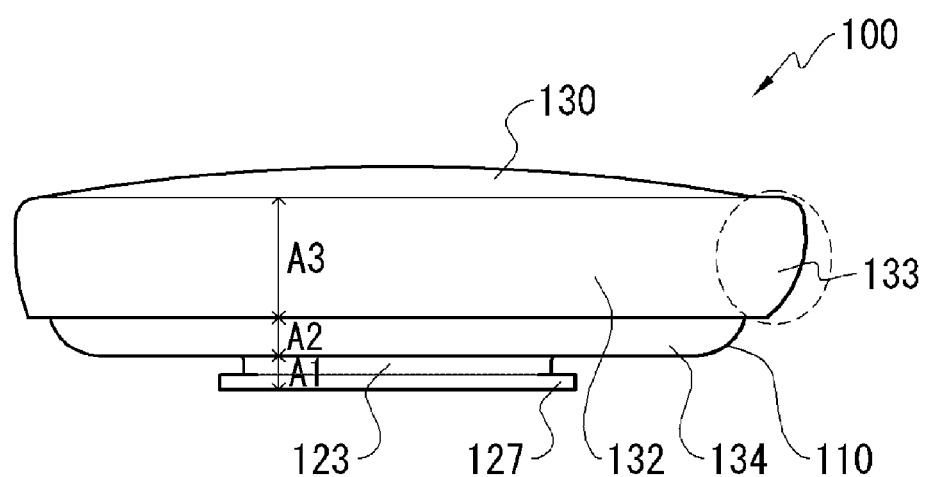
FIGS. 6 to 8 are views illustrating examples of rotors according to embodiments of the present invention.
Figure 7:
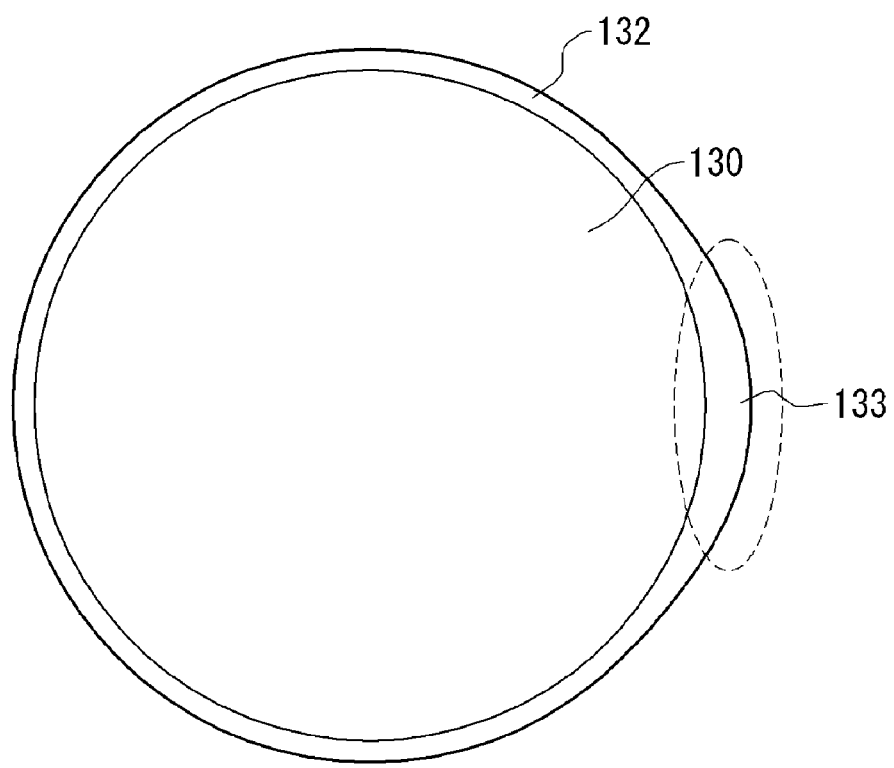
Figure 8:
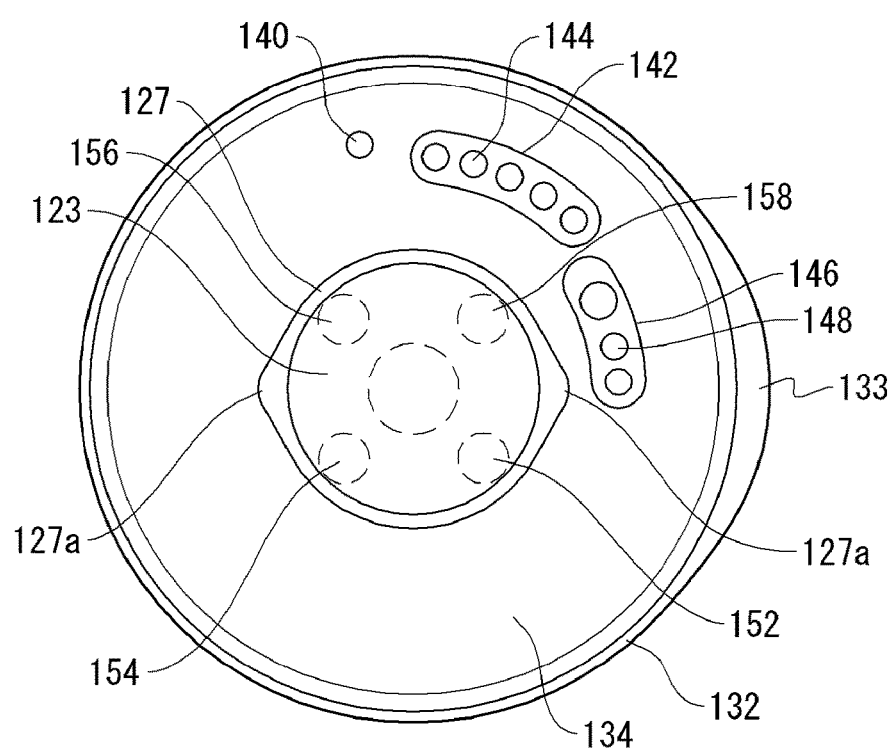

FIGS. 6 to 8 are views illustrating examples of rotors according to embodiments of the present invention. FIG. 6 illustrates an example of a side surface of the rotor 100, and FIG. 7 illustrates an example of the top surface of the rotor 100.

Referring to FIGS. 6 and 7, the rotor 100 may include a rotational shaft A1 (123), an inner A2 (134), an outer A3 (132), and a dome 130. The inner A2 (134) may form a lower portion of the rotor 100. The inner A2 (134) may be seated on the base 200. The inner A2 (134) may face the top surface of the base 200 when the rotor 100 is rotated. An inclined part 110 may be formed at both sides or periphery of the inner A2 (134). The rotational shaft A1 (123) may extend from the bottom surface of the inner A2 (134). The inner A2 (134) and the rotational shaft A1 (123) may be formed in left-right symmetry with respect to the center of rotation of the rotor 100.

The outer A3 (132) may be externally exposed when the rotor 100 rotates on the base 200. The outer A3 (132) may be thicker than the inner A2 (134). The outer A3 (132), together with the inner A2 (134), may be overall shaped as a bowl. The outer A3 (132) may be formed in left-right asymmetry with respect to the center of rotation of the rotor 100. When the rotor 100 rotates on the base 200, if the outer A3 (132) is in left-right asymmetry with the center of rotation of the rotor 100, the degree of rotation of the rotor 100 may be appreciated. The asymmetrical portion 133 of the outer A3 (132) may project beyond the outer A3 (132).

The dome 130 may form an upper surface of the outer A3 (132). The dome 130 may fully or partially cover the upper surface of the outer A3 (132). The dome 130 may form the outer appearance and may include functions. The dome 130 may include a touch window. The dome 130 may include a display unit 1151. That means that the dome 130 may include an input unit 1120 and an output unit 1150.

FIG. 8 illustrates an example of the bottom surface of the rotor 100. FIG. 8 illustrates a button 140, a first terminal 142, a second terminal 146, a first magnetic body 150, third magnetic bodies 152, 154, 156, and 158, a jaw 127, and a sync 127a. The button 140 may be provided in a lower surface of the rotor 100, i.e., at a side of the inner A2 (134). The button 140 may perform, e.g., a reset function or may function to make a coupling or pairing between the rotor 100 and the base 200.

The first terminal 142 and the second terminal 146 may be provided in a lower surface of the rotor 100, i.e., at a side of the inner A2 (134). The first terminal 142 may have a plurality of electrodes 144. The second terminal 146 may have a plurality of electrodes 148. The first terminal 142 or the second terminal 146 may be provided for data communication. The first terminal 142 or the second terminal 146 may be provided to recharge the rotor 100. The first terminal 142 and the second terminal 146 together or separately may perform the above functions.

The first magnetic body 150 may be positioned on the center of rotation of the rotor 100. That is, the first magnetic body 150 may be positioned at the center of the rotational shaft A1 (123). That means that the first magnetic body 150 may be the center of rotation of the rotor 100. The first magnetic body 150 may be magnetized to have an N polarity or S polarity. The third magnetic bodies 152, 154, 156, and 158 may be positioned around the first magnetic body 150. A plurality of third magnetic bodies 152, 154, 156, and 158 may be provided. The third magnetic bodies 152, 154, 156, and 158 may be arranged to be in symmetry with respect to the center of the first magnetic body 150 around the first magnetic body 150. For example, four third magnetic bodies 152, 154, 156, and 158 may be provided that may be positioned apart from each other at predetermined intervals at upper, lower, left, and right sides of the first magnetic body 150. The third magnetic bodies 152, 154, 156, and 158 may have the same or a different polarity from the first magnetic body 150. The plurality of third magnetic bodies 152, 154, 156, and 158 may have the same polarity.

The jaw 127 may be formed as the rotational shaft A1 (123) externally extends from its periphery as described above, and in this case, the sync 127a may be formed that projects and extends relatively further than the jaw 127. The sync 127a may be formed at a side of the jaw 127. The sync 127a may project from one or both sides of the jaw 127. The sync 127a may match a sync hole 227a of the base 200 that is described below.

Figure 9:
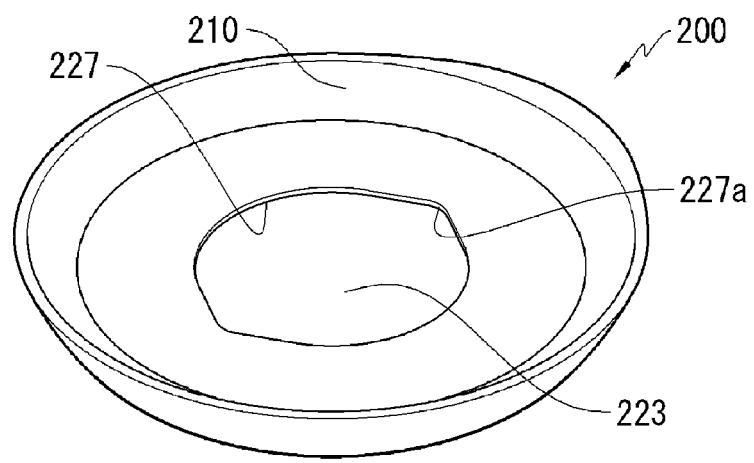
FIG. 9 is a view illustrating an example of a base according to an embodiment of the present invention.

FIG. 9 is a view illustrating an example of a base 200 according to an embodiment of the present invention. The base 200 may be formed to correspond to a lower portion of the rotor 100. The base 200 may be formed to surround the inner A2 (134) of the rotor 100. The base 200 may be overall shaped as a broad plate or shell. The base 200 may have a guiding surface 210 facing the inclined part 110 formed in the inner A2 (134) of the rotor 100. The base 200 may have a rotational hole 223 at its center. The depth of the rotational hole 223 may be consistent with the length of the rotational shaft A1 (123). The hooking hole 227 may be formed at the periphery of a lower portion of the rotational hole 223. The jaw 127 of the rotor 100 as described above may be fitted through the hooking hole 227. Further, the base 200 may have a sync hole 227a opened upward at a side of the rotational hole 223. The sync hole 227a may be formed at one or both sides of the rotational hole 223. The sync hole 227a may match the sync 127a of the rotor 100. Accordingly, the area where the rotor 100 is fitted into the base 200 may be restricted in a predetermined range. In other words, this means that the area where the rotor 100 may be released from the base 200 may be limited in a predetermined range.

As set forth above, the asymmetrical portion 133 of the outer A3 (132) may match the sync 127*a* and the sync hole 227*a*. Accordingly, the asymmetrical portion 133 of the outer A3 (132) may make an indication by which the rotor 100 is inserted and fitted into the base 200.

Figure 10:
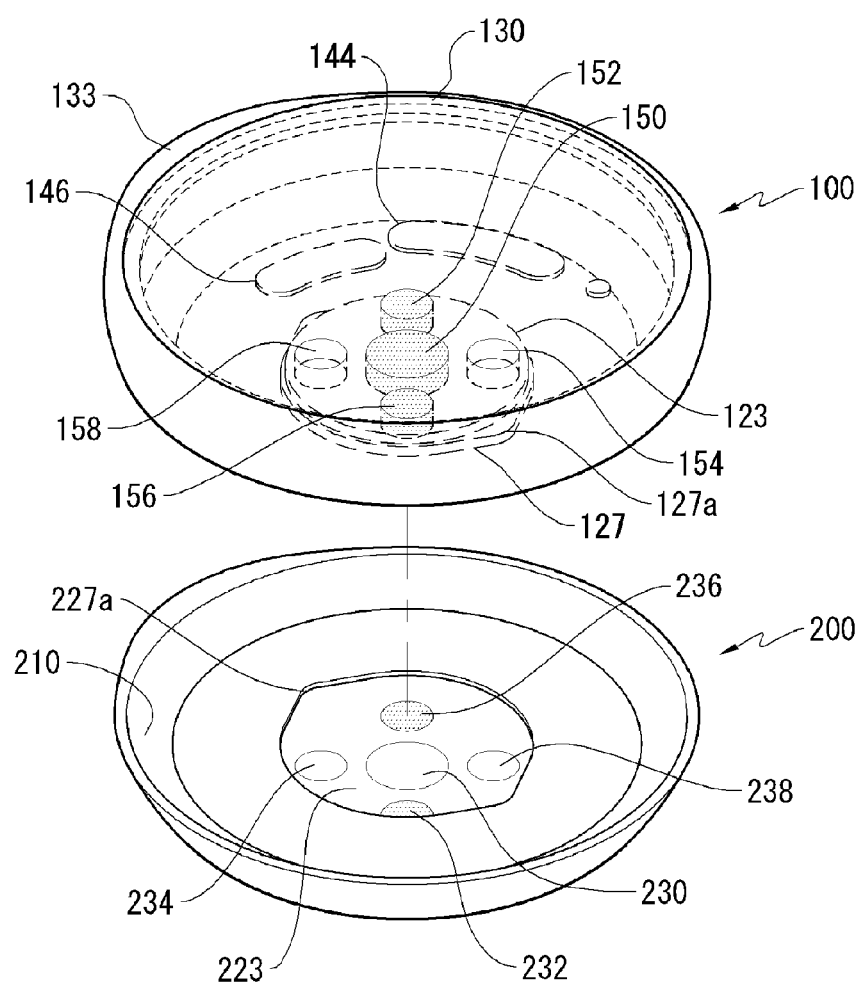
FIGS. 10 to 13 are views illustrating examples of combinations of a rotor and a base according to embodiments of the present invention.
Figure 11:
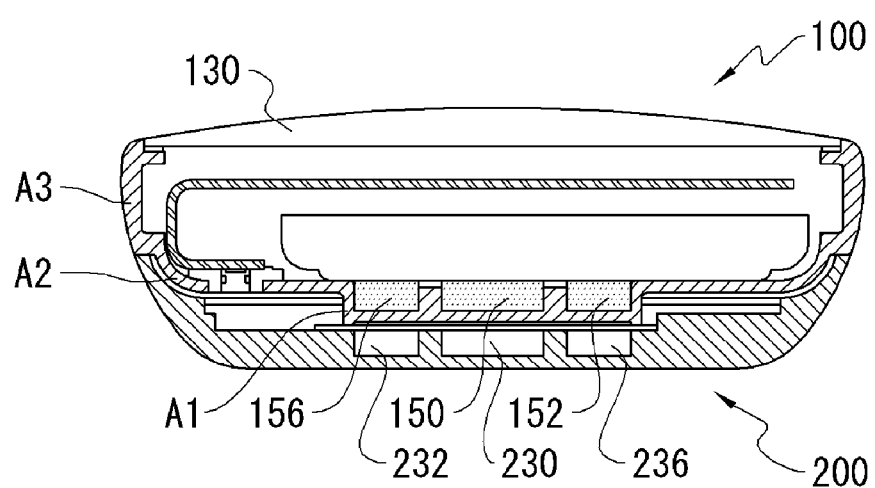
Figure 12:
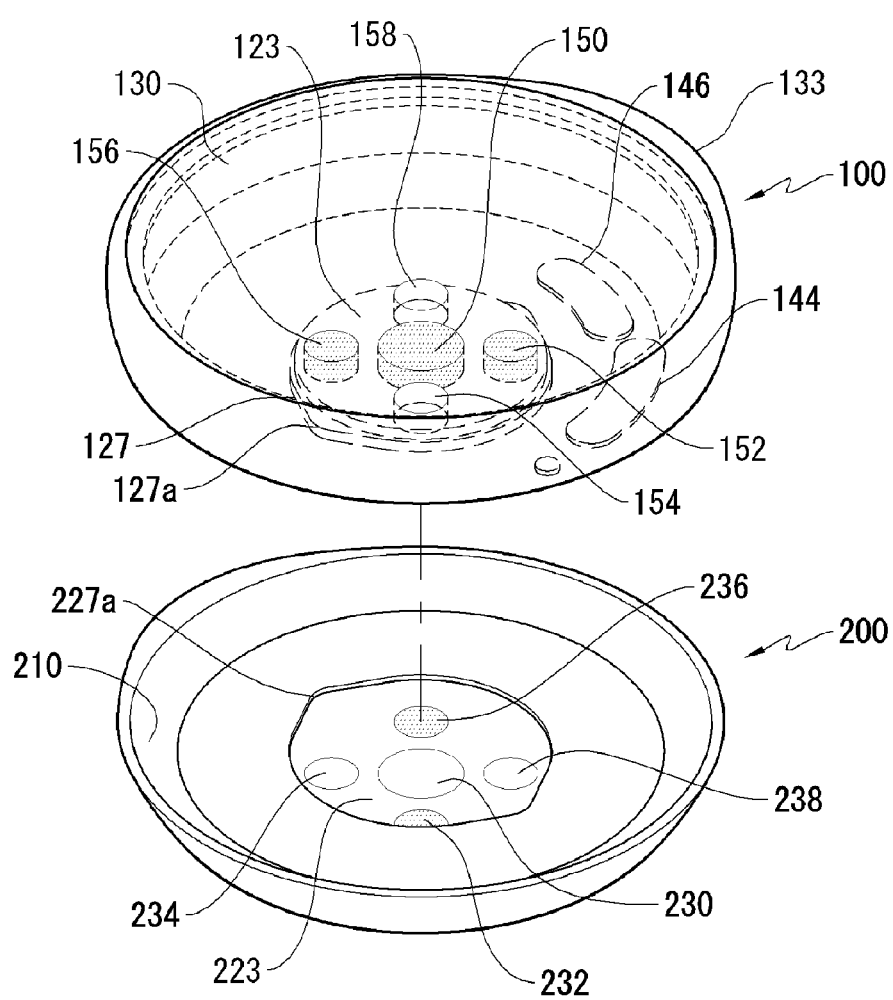
Figure 13:
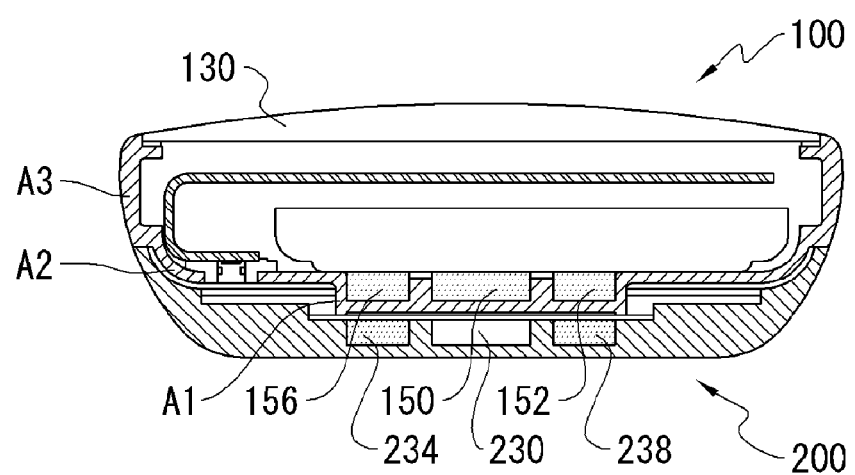

FIGS. 10 to 13 are views illustrating examples of combinations of a rotor and a base according to embodiments of the present invention. FIGS. 10 and 11 illustrate an example where the rotor 100 is plugged into the base 200, and FIGS. 12 and 13 illustrates an example where the rotor 100 turns about 90 degrees in the plugged position.

Referring to FIGS. 10 and 11, the rotor 100 may be plugged into the base 200. In this case, the rotational shaft A1 (123) may be aligned with the rotational hole 223. This means that the first magnetic body 150 may face the second magnetic body 230. Further, the sync 127*a* may match the sync hole 227*a*. In this case, the asymmetrical portion 133 may indicate the direction of the sync 127*a*. The third magnetic bodies 152 and 156 may be positioned opposite fourth magnetic bodies 232 and 236. To the end, the fourth magnetic bodies 232 and 236 may be positioned around the second magnetic body 230. A plurality of fourth magnetic bodies 232 and 236 may be provided. For example, two fourth magnetic bodies 232 and 236 may be provided. The two fourth magnetic bodies 232 and 236 may have the same polarity as the second magnetic body 230. For example, the second magnetic body 230 and the fourth magnetic bodies 232 and 236 may have an S polarity.

Meanwhile, the first magnetic body 150 and the third magnetic bodies 152 and 156 may have the same polarity. The first magnetic body 150 and the third magnetic bodies 152 and 156 may have, e.g., an N polarity. Thus, an attraction force may be created between the rotor 100 and the base 200; i.e., the rotor 100 may attract the base 200 while the base 200 may attract the rotor 100. As the rotor 100 comes closer to the base 200 over the base 200, a magnetic force works to allow the rotor 100 to be coupled with the base 200.

Referring to FIGS. 12 and 13, the rotor 100 may be plugged into the base 200 and may be then rotated about 90 degrees. In this case, the third magnetic bodies 152 and 156 may face fifth magnetic bodies 234 and 238. To the end, the fifth magnetic bodies 234 and 238 may be positioned around the second magnetic body 230. A plurality of fifth magnetic bodies 234 and 238 may be provided. For example, two fifth magnetic bodies 234 and 238 may be provided. The two fifth magnetic bodies 234 and 238 may be arranged alternately with the two fourth magnetic bodies 232 and 236. The two fifth magnetic bodies 234 and 238 may be arranged in order with the two fourth magnetic bodies 232 and 236.

The two fifth magnetic bodies 234 and 238 may have a different polarity from the second magnetic body 230. For example, when the second magnetic body 230 has an S polarity, the two fifth magnetic bodies 234 and 238 may have an N polarity.

Meanwhile, the first magnetic body 150 and the third magnetic bodies 152 and 156 may have the same polarity. The first magnetic body 150 and the third magnetic bodies 152 and 156 may have, e.g., an N polarity.

Accordingly, an attraction force may be created between the first magnetic body 150 and the second magnetic body 230. Further, a repulsive force may be created between the two third magnetic bodies 152 and 156 and the two fifth magnetic bodies 234 and 238. Here, the repulsive force may be smaller than the attraction force. Once the rotational shaft A1 (123) of the rotor 100 is fitted through the rotational hole 223 of the base 200 and then rotates on the base 200, the rotor 100 may keep rotating under the influence of attraction and repulsive force. That is, the rotor 100 may be magnetically levitated by the attraction and repulsive force from the base 200. Such maglev effect may aid in the rotation of the rotor 100. Further, once the rotor 100 starts to turn, its rotation on the base 200 may continue at a reduced force.

Figure 14:
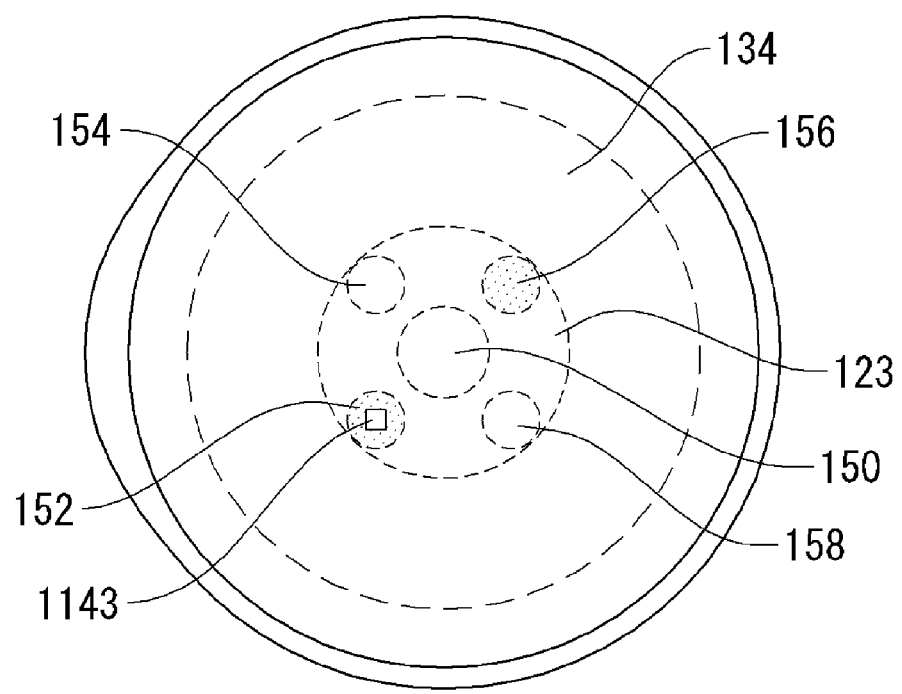
FIG. 14 is a view illustrating an example of a rear surface of a rotor according to an embodiment of the present invention.

FIG. 14 is a view illustrating an example of a rear surface of a rotor 100 according to an embodiment of the present invention. FIG. 14 shows an inner 134, a rotational shaft 123, a first magnetic body 150, third magnetic bodies 152, 154, 156, and 158, and a hall sensor 1143. The hall sensor 1143 may be positioned at an upper side of the third magnetic bodies 152, 154, 156, and 158. A plurality of third magnetic bodies 152, 154, 156, and 158 may be provided. When a plurality of third magnetic bodies 152, 154, 156, and 158 are provided, the hall sensor 1143 may be positioned at any one of the plurality of third magnetic bodies 152, 154, 156, and 158. The hall sensor 1143 may sense a change in polarity made by the fourth magnetic body 232 and the fifth magnetic body 234. When the rotor 100 rotates on the base 200, the third magnetic bodies 152, 154, 156, and 158 may be positioned opposite the fourth magnetic body 232 or fifth magnetic body 234. The fourth magnetic body 232 may have a different polarity from the fifth magnetic body 234, and thus, a change in polarity may be sensed by the hall sensor 1143.

Figure 15:
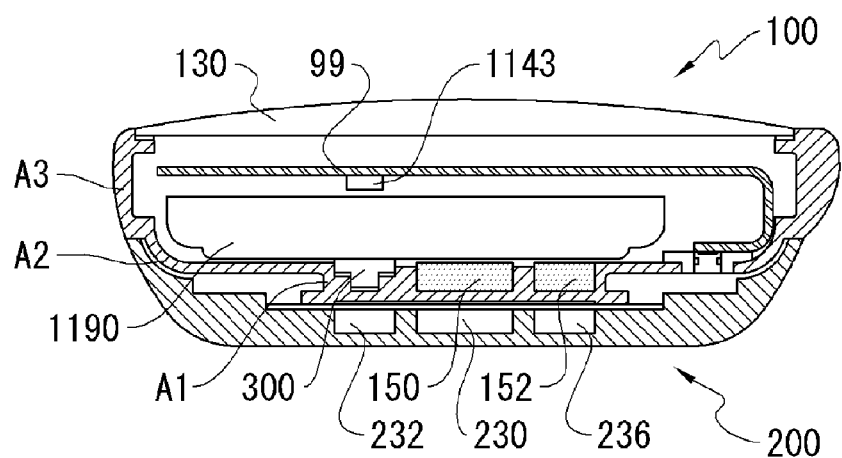
FIGS. 15 and 16 are views illustrating examples of cross sections of an electronic device according to an embodiment of the present invention.
Figure 16:
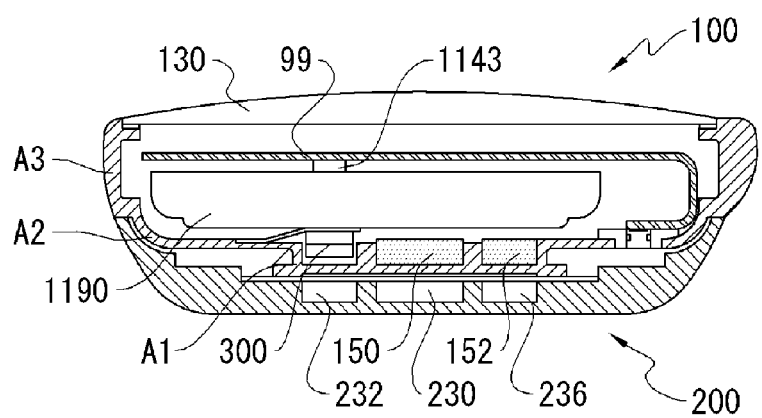

FIGS. 15 and 16 are views illustrating examples of cross sections of an electronic device according to an embodiment of the present invention. FIGS. 15 and 16 illustrate a first magnetic body 150, a second magnetic body 230, a third magnetic body 152, a fourth magnetic body 232 or a fifth magnetic body 234, a PCB 99, a hall sensor 1143, a power supply 1190, and a sound unit 300, wherein the rotor 100 and the base 200 are in assembly.

The PCB 99 may be embedded in the rotor 100. Alternatively, the PCB 99 may be embedded in the base 200. The hall sensor 1143 may be mounted on the PCB 99. In this case, the hall sensor 1143 may be positioned over the fourth magnetic body 232 or fifth magnetic body 234. This may mean that the hall sensor 1143 may be aligned with the fourth magnetic body 232. Or, this may mean that the hall sensor 1143 may be aligned with the fifth magnetic body 234. Being aligned may mean that it may be done instantaneously when the rotor 100 rotates on the base 200 or steadily when the rotation of the rotor 100 on the base 200 stops.

The sound unit 300 may be embedded in the rotor 100. The sound unit 300 may be positioned over the fourth magnetic body 232 of the base 200. Or, the sound unit 300 may be positioned over the fifth magnetic body 234 of the base 200. This may mean that the sound unit 300 may be aligned with the fourth magnetic body 232. Or, this may mean that the sound unit 300 may be aligned with the fifth magnetic body 234. Being aligned may mean that it may be done instantaneously when the rotor 100 rotates on the base 200 or steadily when the rotation of the rotor 100 on the base 200 stops.

Hence, as the rotor 100 rotates on the base 200, the sound unit 300 may be positioned over the fourth magnetic body 232, and as the rotor 100 rotates further, the sound unit 300 may be positioned over the fifth magnetic body 234 to make a sound. The sound unit 300 may make a sound by way of a difference in polarity between the fourth magnetic body 232 and the fifth magnetic body 234, which is described below.

FIGS. 17 to 21 are views illustrating examples of sound units 300 of an electronic device according to embodiments of the present invention.

Figure 17:
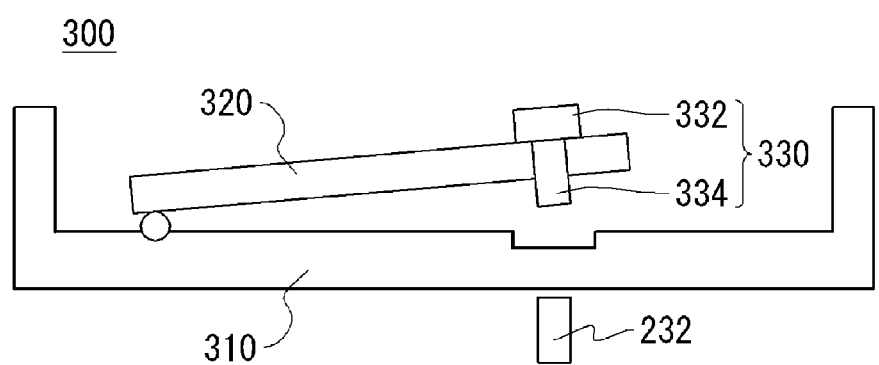
FIGS. 17 to 21 are views illustrating examples of sound units of an electronic device according to embodiments of the present invention.

FIG. 17 shows a fourth magnetic body 232, a housing 310, a pivot lever 320, and a sounder 330. The pivot lever 320 may have one side pivotally fixed to a side of the housing 310. The sounder 330 may be mounted at another side of the pivot lever 320. The sounder 330 may have a magnetic property. For example, the sounder 330 may be an N or S-polarity magnet. When the sound 330 is an S-polarity magnet, and the fourth magnetic body 232 has an S polarity, the sounder 330 may be pushed against the fourth magnetic body 232 to float in the air. The sounder 330 may have a magnetic part 332 and a metal part 334. The magnetic part 332 may have an N or S polarity as described above. The metal part 334 may be provided to make a sound while hitting the housing 310.

Figure 18:
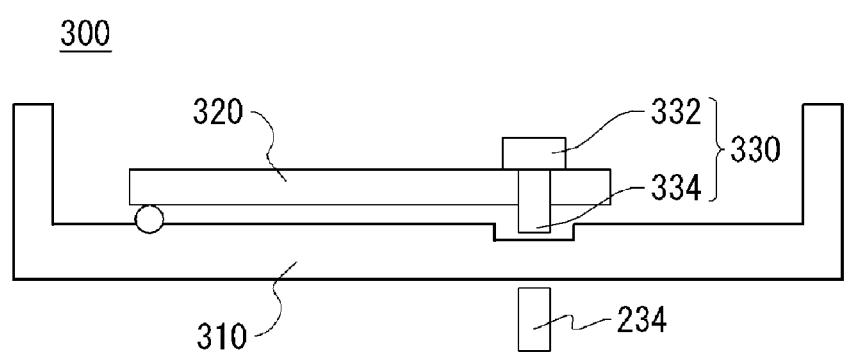

FIG. 18 shows a fifth magnetic body 234, a housing 310, a pivot lever 320, and a sounder 330. The fifth magnetic body 234 may have, e.g., an N polarity. The rotor 100 rotates on the base 200, so that the sound unit 300 moves from over the fourth magnetic body 232 to over the fifth magnetic body 234. At this time, the sounder 330 may be attracted by the fifth magnetic body 234, so that the metal part 334 may touch the housing 310. As the rotor 100 steadily rotates on the base 200, the metal part 334 may repeat to touch on and off from the housing 310. Thus, the sound unit 300 may make a sound.

Figure 19:
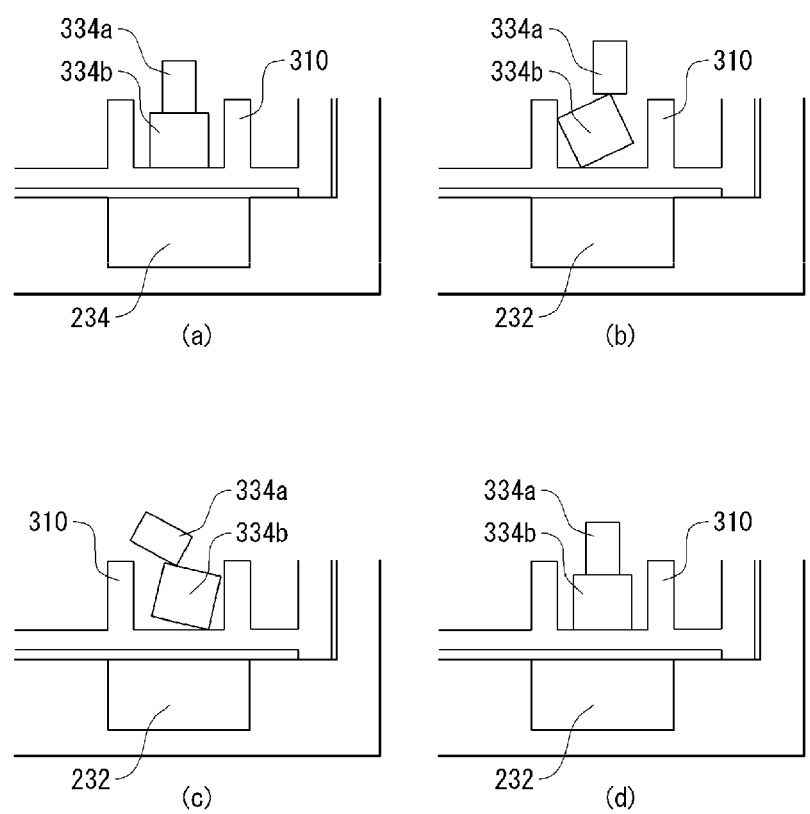

Referring to FIG. 19, the sounder 330 may include a first cube 334b and a second cube 334a. The first cube 334b may be a magnet bigger than the second cube 334a. The first cube 334b may have one side with an N polarity and the other side with an S polarity. The second cube 334a may have one side with an N polarity and the other side with an S polarity. The first cube 334b and the second cube 334a may be stacked inside the housing 310. For example, the second cube 334a may be loaded on the first cube 334b.

Referring to FIG. 19(a), the fourth magnetic body 234 may be positioned under the sound unit 300. Referring to FIG. 19(b), as the rotor 100 rotates on the base 200, the fifth magnetic body 232 may be positioned under the sound unit 300. Referring to FIG. 19(a), when the fourth magnetic body 234 is positioned under the sound unit 300, the first cube 334b and the second cube 334a may be aligned so that the same polarity as the fourth magnetic body 234 is oriented downwards. Referring to FIG. 19(b), when the rotor 100 rotates so that the fifth magnetic body 232 is positioned under the sound unit 300, the first cube 334b and the second cube 334a may face a change in position due to the change in polarity. Further, as shown in FIGS. 19(c) and (d), the first cube 334b and the second cube 334a may turn back to the aligned position. Thus, the sounder 330 may make a sound.

Figure 20:
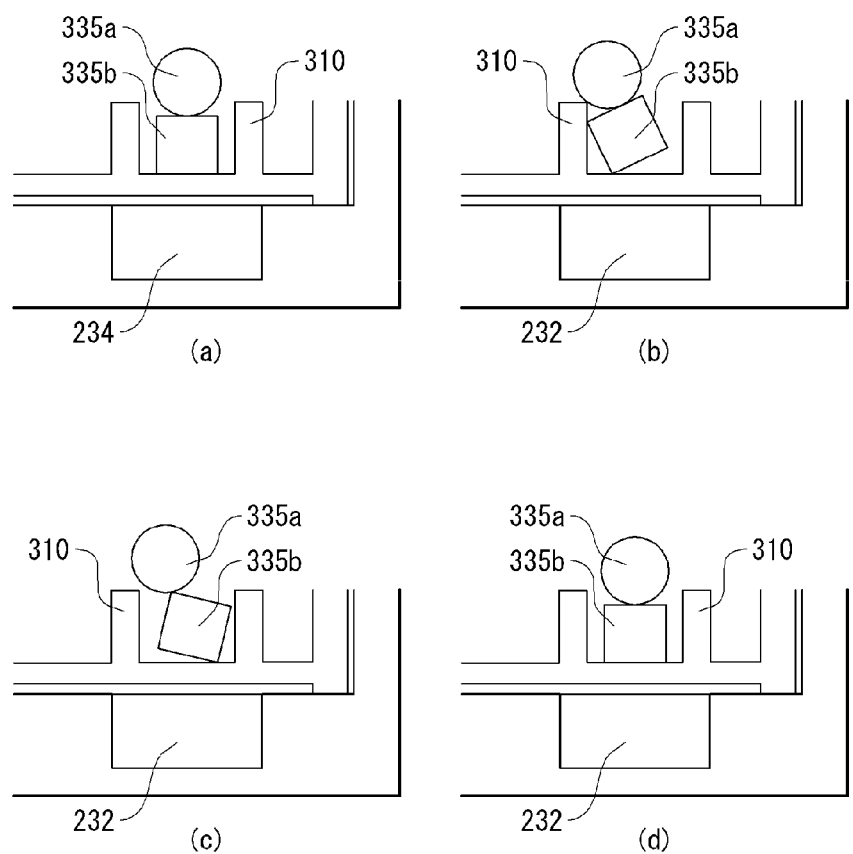

Referring to FIG. 20, the sounder 330 may include a ball 335a and a cube 335b. The cube 335b may have one side with an N polarity and the other side with an S polarity. The ball 335a and the cube 335b may be stacked inside the housing 310. For example, the ball 335a may be loaded on the cube 335b.

Referring to FIG. 20(a), the fourth magnetic body 234 may be positioned under the sound unit 300. Referring to FIG. 20(b), as the rotor 100 rotates on the base 200, the fifth magnetic body 232 may be positioned under the sound unit 300. Referring to FIG. 20(a), when the fourth magnetic body 234 is positioned under the sound unit 300, the ball 335a and the cube 335b may be aligned so that the same polarity as the fourth magnetic body 234 is oriented downwards. Referring to FIG. 20(b), when the rotor 100 rotates so that the fifth magnetic body 232 is positioned under the sound unit 300, the ball 335a and the cube 335b may face a change in position due to a change in polarity. As shown in FIGS. 20(c) and (d), the ball 335a and the cube 335b may then turn back to the aligned position. Thus, the sounder 330 may make a sound.

Figure 21:
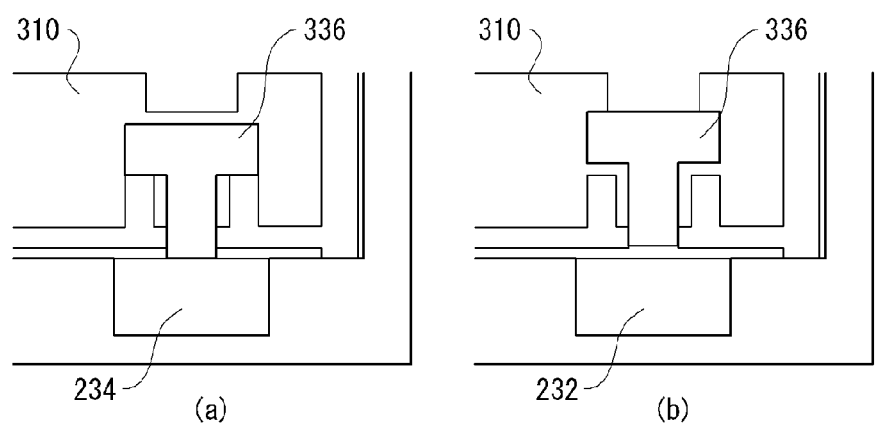

Referring to FIG. 21, the sounder 330 may be provided in the housing 310 to move up and down. The sounder 330 may have one side with an N polarity and the other side with an S polarity. For example, the sounder 330 may have an upper portion with an N polarity and a lower portion with an S polarity.

Referring to FIG. 21(a), the fourth magnetic body 234 may be positioned under the rotor 100. Here, the fourth magnetic body 234 may have an N polarity. The sounder 330 may be attracted by the fourth magnetic body 234. Referring to FIG. 21(b), as the rotor 100 rotates on the base 200, the fifth magnetic body 232 may be positioned under the rotor 100. Here, the fifth magnetic body 232 may have an S polarity. The sounder 330 may be pushed against the fifth magnetic body 232. As such, the sounder 330 may be moved up and down while repetitively and alternately pushed and attracted as the rotor 100 rotates. Thus, the sounder 330 may make a sound.

FIGS. 22 to 26 are views illustrating examples of bases according to embodiments of the present invention.

Figure 22:
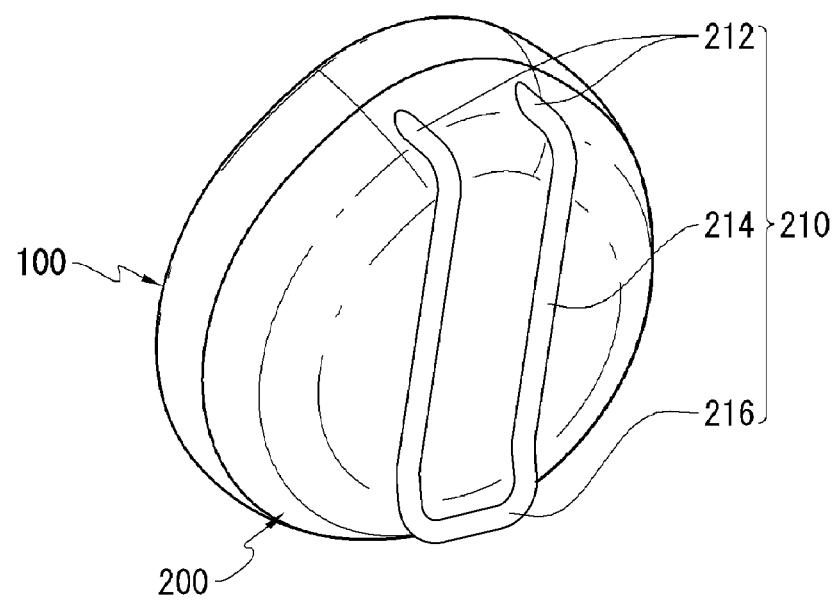
FIGS. 22 to 26 are views illustrating examples of bases according to embodiments of the present invention.

Referring to FIG. 22, the base 200 may have a clip 210 on its back or rear surface. The clip 210 may be fixed to a side of the base 200. The clip 210 may be elastic. For example, the clip 210 may include a fixing part 212 and an elastic part 214. The fixing part 212 may be fastened to a side on the back or rear surface of the base 200. The elastic part 214 may extend long from the fixing part 212 to the other side of the base 200. For example, the clip 210 may have a U shape that extends long and bends. The fixing part 212 of the clip 210 may be formed at both ends of the clip 210. The elastic part 214 may be extend long from the fixing part 212 and may bend apart from the back or rear surface of the base 200 in the "hairpin course" that forms a U shape. This allows the base 200 to be easily attached or detached.

Figure 23:
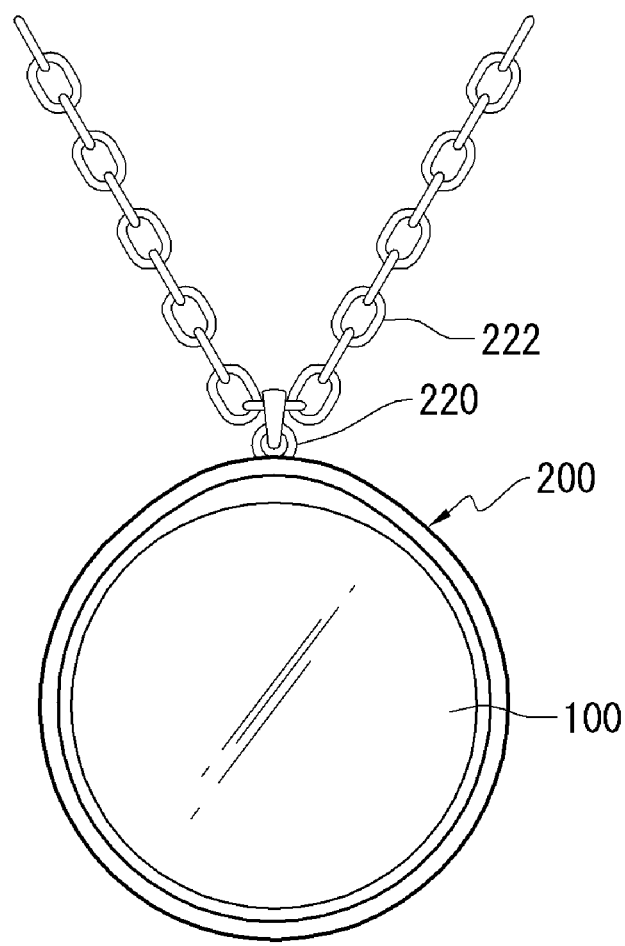

Referring to FIG. 23, the base 200 may have a ring 220 at a side thereof. For example, the ring 220 may be fastened to one of a side surface and back or rear surface of the base 200. A chain 222 may be coupled to the ring 220. This allows the user to readily put the base 200 on his neck.

Figure 24:
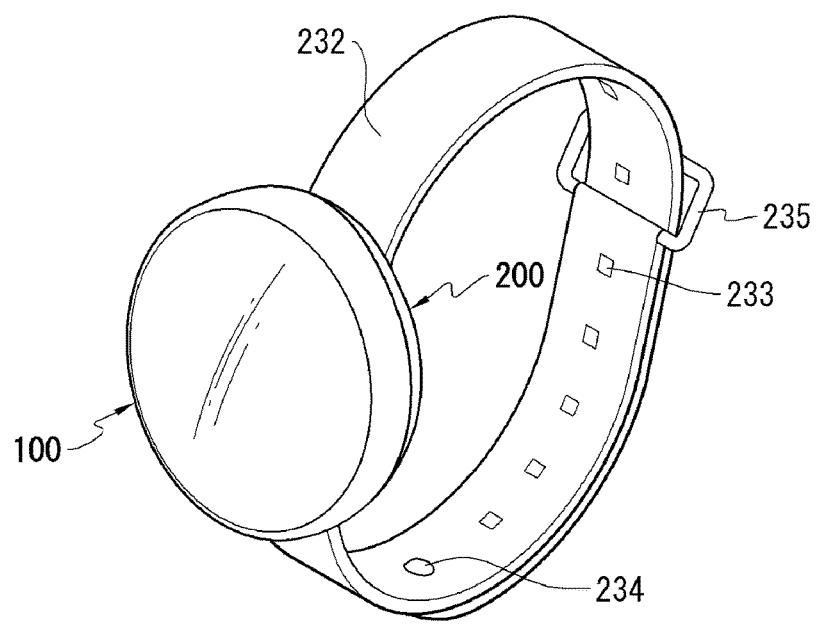

Referring to FIG. 24, the base 200 may have bands 231 and 232 extending from both sides thereof. For example, the bands 231 and 232 may include a first band 231 extending from one side of the base 200 and a second band 232 extending from the other side of the base 200. The first band 231 may have a plurality of holes 233 punched. The plurality of holes 233 may be aligned long in the direction of the extension of the first band 231. A ring 235 may be provided at an end of the first band 231 to allow insertion of the second band 232. A hook 234 may be formed at an end of the second band 232. The second band 232 may be inserted through the ring 235 of the first band 231, and the length of the bands 231 and 232 may be adjusted by the hook 234 and the plurality of holes 233.

Figure 25:
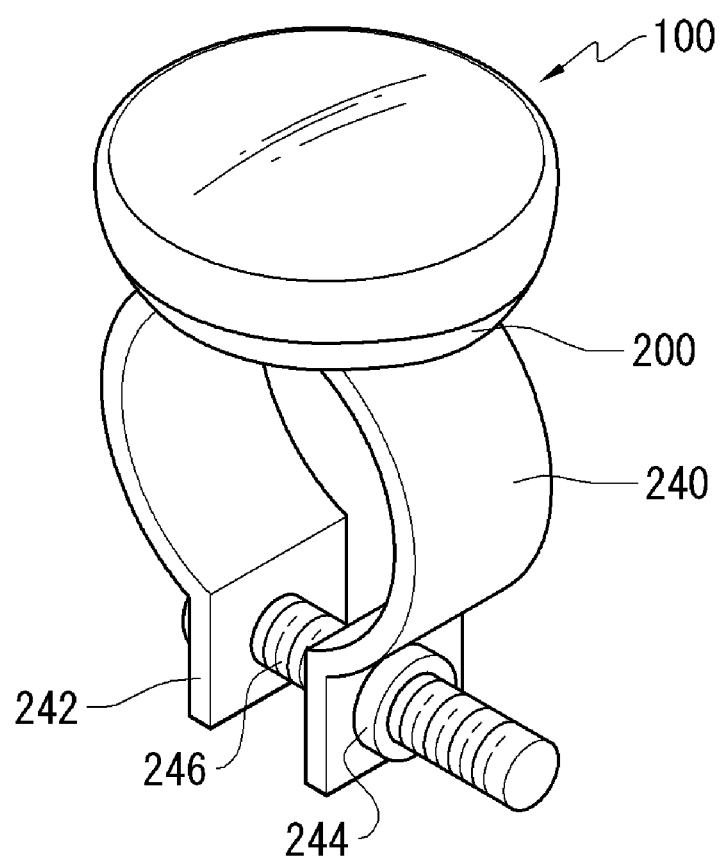

Referring to FIG. 25, the base 200 may have a fastening ring 240 on its back or rear surface. The fastening ring 240 may extend long in two ways from the back or rear surface of the base 200 and may be curved. The fastening ring 240 may be overall shaped as the letter "U" or "Ω." A fastening screen 246 may be inserted through both ends 242 and 244 of the fastening ring 240. The fastening screw 246 may tighten the ends 242 and 244 of the fastening ring 240 that are spaced apart from each other. Accordingly, the base 200 may be fastened to fitness equipment or a bicycle.

Figure 26:
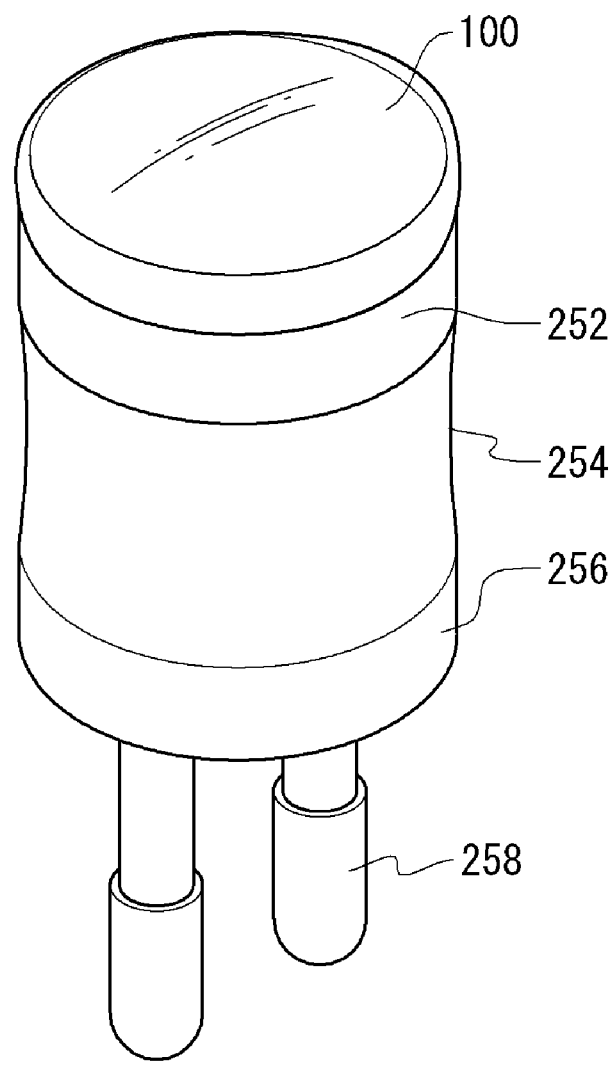

Referring to FIG. 26, the base 200 may be a plug. The base 200 may include a body 252, 254, and 256 and terminals 258. The body 252, 254, and 256 may be overall shaped as an empty or solid cylinder. The body 252, 254, and 256 may be substantially the same in diameter as the rotor 100. For example, an upper portion 252 of the body may be similar in diameter to the rotor 100. A middle portion 254 of the body may be smaller in diameter than the rotor 100. A lower portion 256 of the body may be similar in diameter to the rotor 100. This allows the base 200 to be easily plugged in or out of an outlet. A plurality of terminals 258 may be provided to fit, e.g., 220V or 110V. The body 252, 254, and 256 may include a transformer. Or, the body 252, 254, and 256 may include an AC-DC converter.

Figure 27:
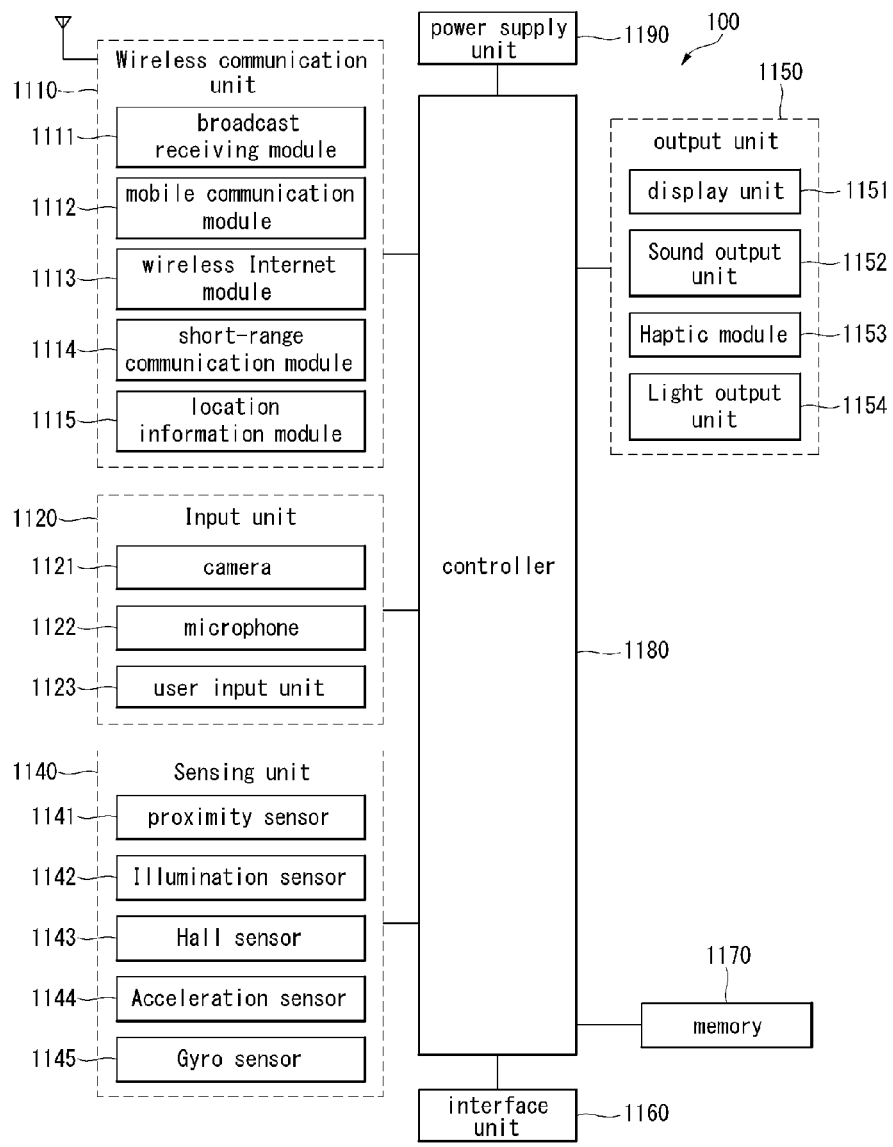
FIG. 27 is a view illustrating an example of a configuration of an electronic device according to an embodiment of the present invention.

FIG. 27 is a view illustrating an example of a configuration of an electronic device according to an embodiment of the present invention.

The rotor 100 or the base 200 may include a wireless communication unit 1110, an input unit 1120, a sensing unit 1140, an output unit 1150, an interface unit 1160, a memory 1170, a controller 1180, and a power supply unit 1190. The elements shown in FIG. 27 is not necessary for implementing the rotor 100 or the base 200, and the rotor 100 or base 200 described herein may include more or less than the elements enumerated above. Hereinafter, the rotor 100 and the base 200 are collectively referred to as an electronic device.

More specifically, among the elements listed above, the wireless communication unit 1110 may include one or more modules that enable wireless communication between the electronic device and a wireless communication system, between the electronic device and a mobile terminal, or between the electronic device and an external server. Further, the wireless communication unit 1110 may include one or more modules that connect the electronic device to one or more networks.

The wireless communication unit 1110 may include at least one of a broadcast receiving module 1111, a mobile communication module 1112, a wireless Internet module 1113, a short-range communication module 1114, and a location information module 1115.

The input unit 1120 may include a camera 1121 or image input unit for inputting image signals, a microphone 1122 or audio input unit for inputting audio signals, and a user input unit 1123 (e.g., a touch key or mechanical key) for receiving information from the user. Voice data or image data collected by the input unit 1120 may be analyzed and processed by the user's control commands.

The sensing unit 1140 may include one or more sensors for sensing at least one of information in the electronic device, information regarding surroundings of the electronic device, and user information. For example, the sensing unit 1140 may include at least one of a proximity sensor 1141, an illumination sensor 1142, a touch sensor, an acceleration sensor 1144, a magnetic sensor, a G-sensor, a gyroscope sensor 1145, a motion sensor, n RGB sensor, an infrared (IR) sensor a finger scan sensor, an ultrasonic sensor, an optical sensor (e.g., refer to the camera 1121), a microphone (refer to the microphone 1121), a battery gauge, an environment sensor (e.g., a barometer, humidity meter, thermometer, radioactivity sensor, heat sensor, or gas sensor), a chemical sensor (e.g., an electronic nose, healthcare sensor, bio recognition sensor), and a hall sensor 1143. Meanwhile, the electronic device disclosed herein may combine and utilize information sensed by at least two of the sensors.

The output unit 1150 may be provided to generate a visual, audible, or tactile output, and may include at least one of a display unit 1151, a sound output unit 1152, a haptic module 1153, and a light output unit 1154. The display unit 1151 may have a layered-structure with a touch sensor or may be formed as a single body with a touch sensor, implementing a touchscreen. The touchscreen may function as the user input unit 1123 providing an input interface between the electronic device and the user and may offer an output interface between the electronic device and the user.

The interface unit 1160 plays a role as a pathway with various types of external devices connected to the electronic device. The interface unit 1160 may include at least one of a wired/wireless headset port, an external recharger porter, a wired/wireless data port, a memory card port, a port for connecting a device having an identification module, an audio input/output (I/O) port, a video input/output (I/O) port, and an earphone port. Corresponding to connection of an external device to the interface unit 1160, the electronic device may perform proper control related to the connected external device.

The memory 1170 stores data supportive of various functions of the electronic device. The memory 1170 may retain several application programs or applications running on the electronic device and data and commands for the operation of the electronic device. At least some of the application programs may be downloaded from an external server through wireless communications. Further, at least some of the application programs may be included in the electronic device before coming to the market so as to do basic functions of the electronic device (e.g., call or message reception and calling). Meanwhile, the application programs may be stored in the memory 1170, installed on the electronic device, and driven to perform the operation (or functions) of the electronic device by the controller 1180.

The controller 1180 typically performs the overall control on the electronic device in addition to the operations related to the application programs. The controller 1180 may provide the user with appropriate functions or information or perform processing by driving the application programs stored in the memory 1170 or may process signals, data, and information input or output through the above-described elements.

Further, the controller 1180 may control at least some of the elements described above in connection with FIG. 27 to drive the application programs stored in the memory 1170. Further, the controller 1180 may combine and operate at least two or more of the elements included in the electronic device in order to drive the application programs.

The power supply unit 1190 receives external or internal power and supplies power to each element included in the electronic device under the control of the controller 1180. The power supply unit 1190 includes a battery that may be a non-removable or removable battery.

At least some of the elements may cooperate with each other to implement the operation, control, or control methods described below according to various embodiments of the present invention. Further, the operation, control, and control methods of the electronic device may be implemented on the electronic device by driving at least one application program stored in the memory 1170.

FIGS. 28 to 37 are views illustrating examples of using an electronic device according to an embodiment of the present invention.

Figure 28:
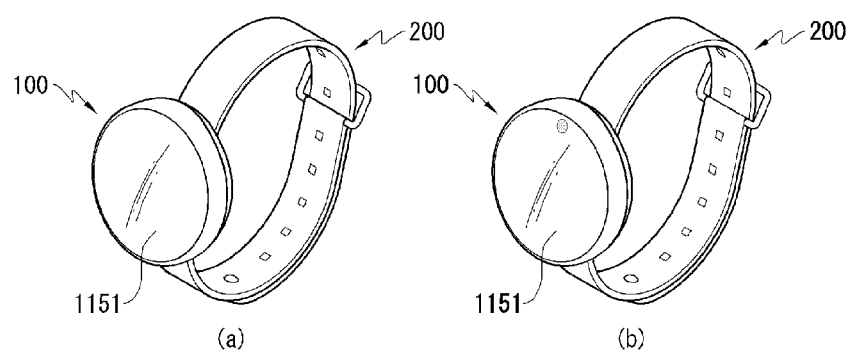
FIGS. 28 to 37 are views illustrating examples of using an electronic device according to an embodiment of the present invention.
Figure 28:
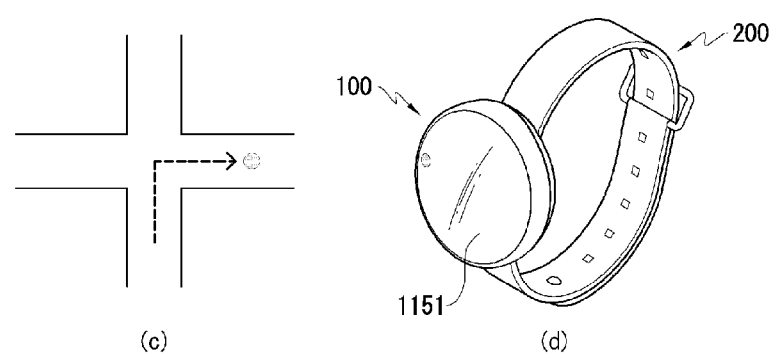

FIG. 28 shows an example of an electronic device performing a navigation function according to an embodiment of the present invention. Referring to FIG. 28(*a*), the electronic device may have a navigation function activated. The navigation function may be performed by a GPS device. The navigation function may be conducted by a sensor for sensing a geomagnetic field. For example, if the navigation function of the electronic device is activated, the electronic device may sense the geomagnetic field and indicate its target direction to the north (refer to FIG. 28(*b*)). In this case, the target direction may be displayed on the display unit 1151. Even when the direction changes depending on the path along which the electronic device travels, the electronic device may steadily display the target direction (refer to FIG. 28(*c*)). When the travel path of the electronic device reaches the destination, the indication of the target direction may be deactivated (refer to FIG. 28(*d*)).

Figure 29:
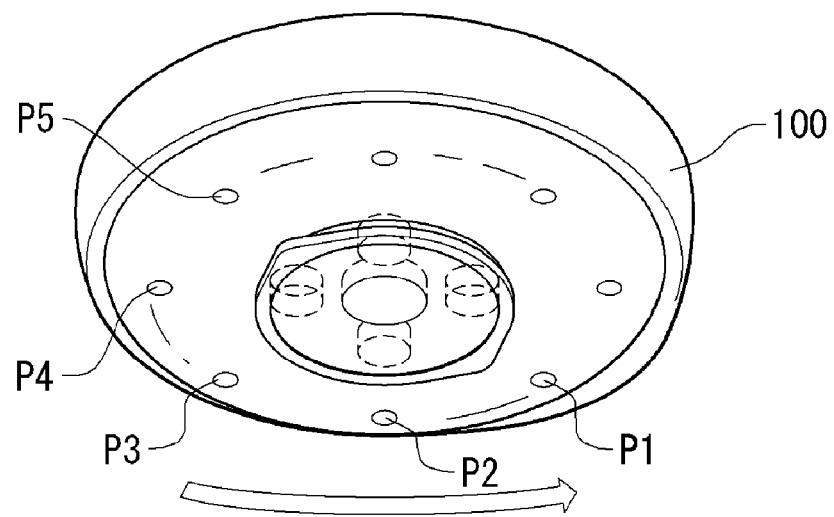
Figure 29:
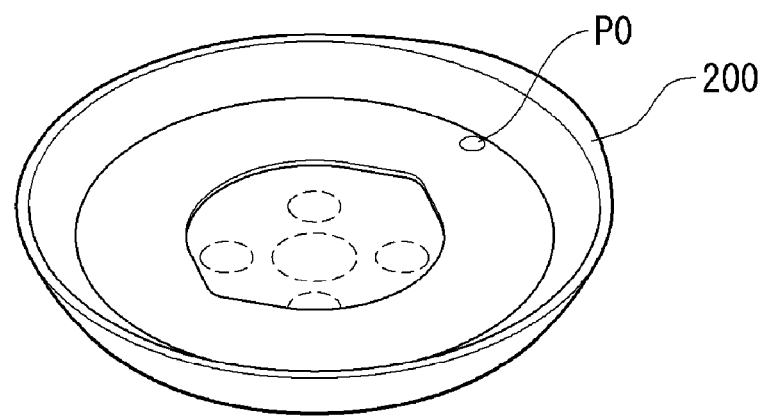

FIG. 29 shows an example of setting a target of control of an electronic device according to an embodiment of the present invention. Referring to FIG. 29, the rotor 100 may include a plurality of terminals P1 to P5. The plurality of terminals P1 to P5 may be positioned on the bottom of the rotor 100. Further, the base 200 may have a terminal P0. The terminal P0 of the base 200 may be provided on the top of the base 200. Accordingly, the plurality of terminals P1 to P5 and the terminal of the base 200 may contact each other when the rotor 100 rotates on the base 200. In this case, for each of the plurality of terminals P1 to P5, a predetermined function may be set. For example, among the plurality of terminals P1 to P5, one P1 may be of a radio setting, another P2 of an illumination setting, still another P3 of an air-conditioner setting, yet still another P4 of a TV setting, and the other P5 of an audio setting. When any one of the plurality of terminals P1 to P5 contacts the terminal P0 of the base 200 as the rotor 100 rotates on the base 200, a terminal resistance may change. The controller 1180 may adjust the functions set, which are obtained by changes in the terminal resistance, through the wireless communication unit 1110. That is, if a radio was set, the radio volume may be adjusted as the rotor 100 rotates. If an illumination was set, the intensity of illumination may be adjusted as the rotor 100 rotates. If an air conditioner was set, the air volume or temperature may be adjusted as the rotor 100 rotates.

Figure 30:
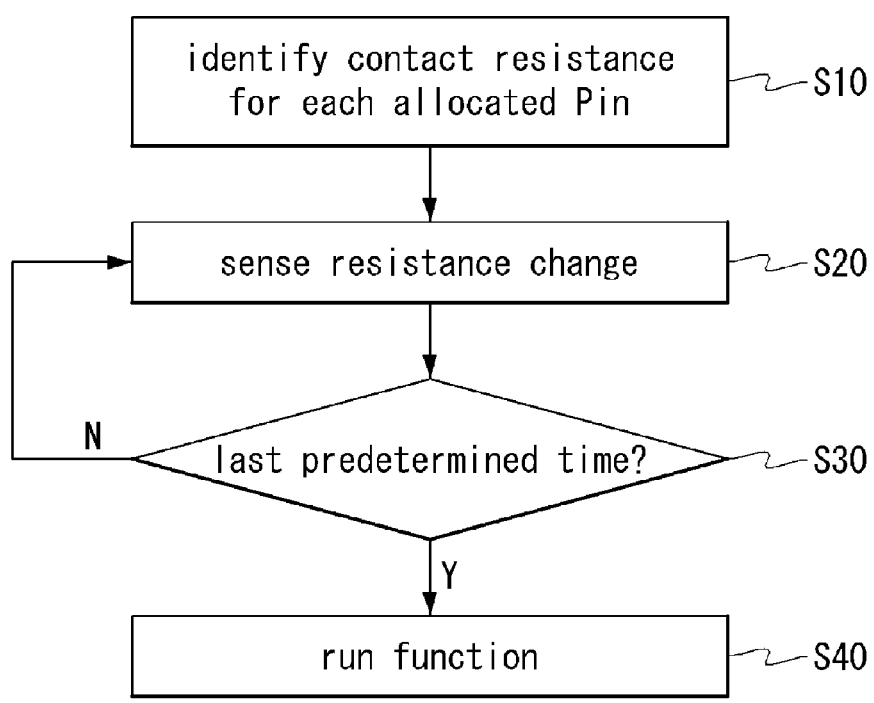

FIG. 30 illustrates an example of order of control of an electronic device according to an embodiment of the present invention. Referring to FIG. 30, as the rotor 100 rotates on the base 200, any one of the plurality of terminals P1 to P5 may contact the terminal P0 of the base 200 (S10). At this time, terminal resistance information may be obtained (S20). Upon sensing a change in the terminal resistance, it may be determined whether the changed terminal resistance lasts a predetermined time or more (S30). This is for distinguishing a change in the terminal resistance that may arise merely as the rotor 100 rotates on the base 200 from a change in the terminal resistance for setting functions. If the changed terminal resistance lasts a predetermined time or more, the electronic device may run the set function (S40).

Figure 31:
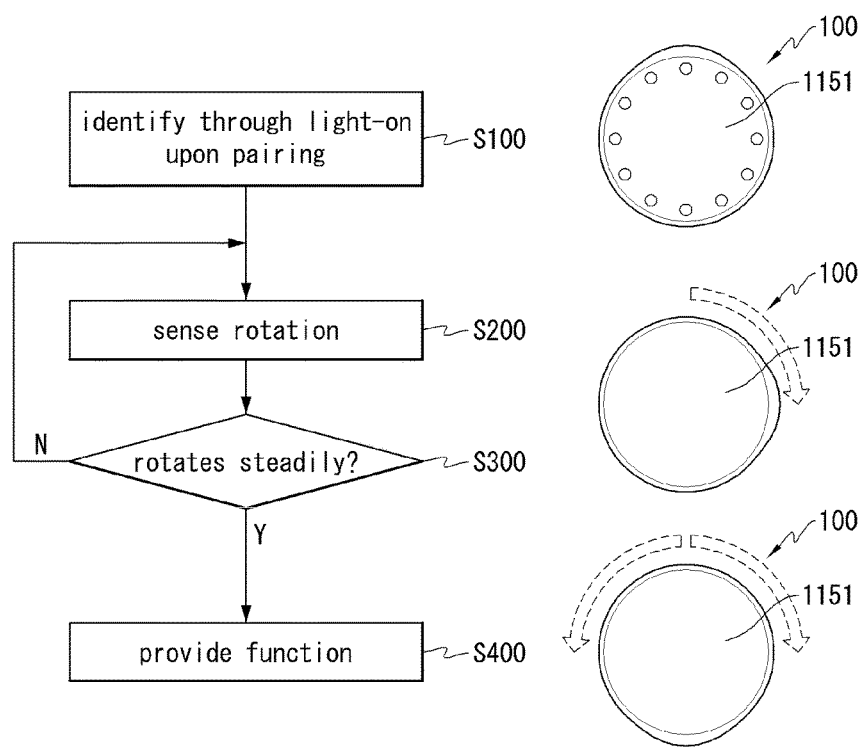

FIG. 31 shows an example of use of an electronic device according to an embodiment of the present invention. Referring to FIG. 31, if the rotor 100 couples or pairs with the base 200, the display unit 1151 may display information on the coupled or paired state. As the rotor 100 rotates on the base 200, the hall sensor 1143 may sense a change in magnetic property due to the rotation of the rotor 100. Here, unless the rotor 100 continues to rotate, the rotation of the rotor 100 might not be for control purposes. In contrast, if the rotation of the rotor 100 steadily goes on, the rotation of the rotor 100 may be for control purposes. That is, necessary functions may be adjusted according to the rotation of the rotor 100 by identifying the coupling or pairing between the rotor 100 and the base 200 and sensing whether the rotation of the rotor 100 steadily goes on or not.

Figure 32:
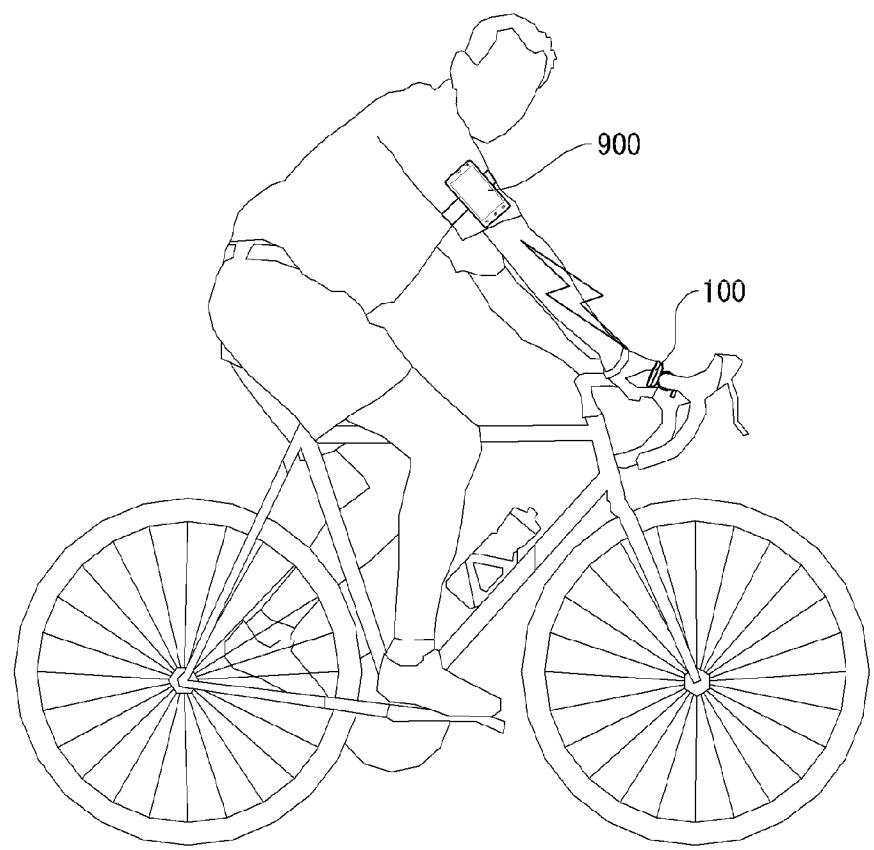

FIG. 32 shows an example of use of an electronic device according to an embodiment of the present invention. Referring to FIG. 32, the electronic device may be attached to a handlebar of a bicycle. The base 200 may be attached to the handlebar of the bicycle, and the rotor 100 may couple or pair with the base 200. Here, the user may put on a mobile terminal 900. The user may listen to music through the mobile terminal 900 or take a receiving call while bicycling. However, the manipulation of the mobile terminal 900 while in ride may treat the user's safety. The electronic device may be attached to a handlebar of the bicycle to aid in the user's manipulation, resulting in reduced danger.

Figure 33:
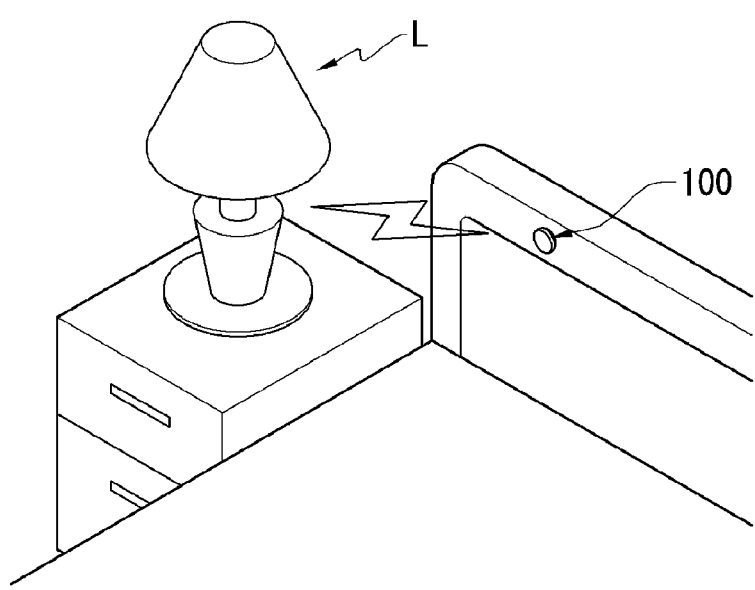

FIG. 33 shows an example of use of an electronic device according to an embodiment of the present invention. Referring to FIG. 33, the electronic device may adjust a lamp L. The lamp L may be installed on the ceiling in the room. An indirect lightening lamp L may be positioned away from the user. In such case, the user may adjust the lamp L through the electronic device. For example, the user who wears or carries the electronic device may turn around the rotor 100 to adjust the brightness of the lamp L when he desires.

Figure 34:
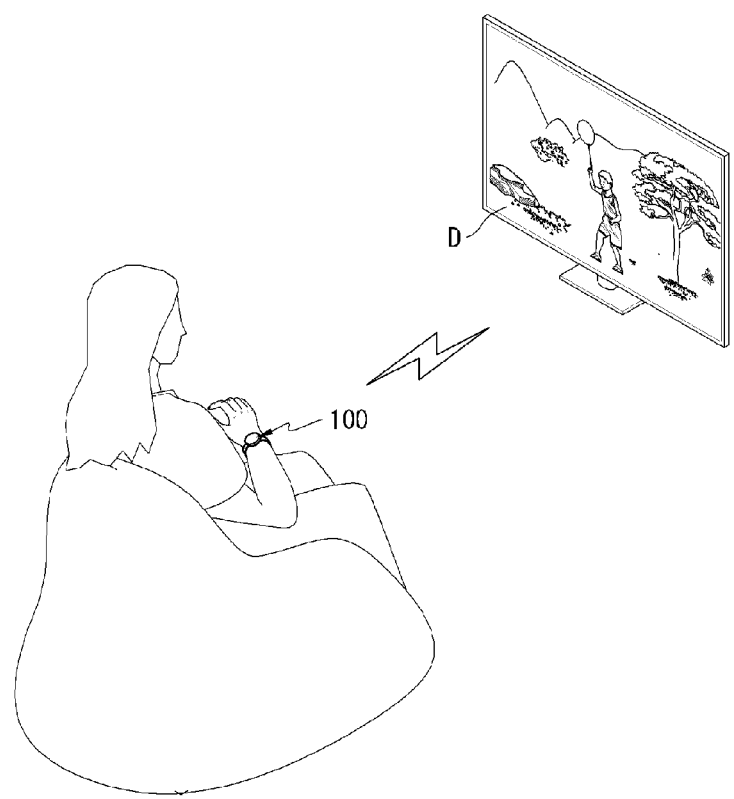

FIG. 34 shows an example of use of an electronic device according to an embodiment of the present invention. Referring to FIG. 34, the electronic device may adjust another electronic device. The other electronic device may be a display device D. For example, the user may view a TV program through the display, away from a large-screen display device D. The user may wear or carry the electronic device. The user may turn channels on the display or adjust sound volume. To that end, the user may do channel turning or volume adjustment by turning around the rotor 100.

Figure 35:
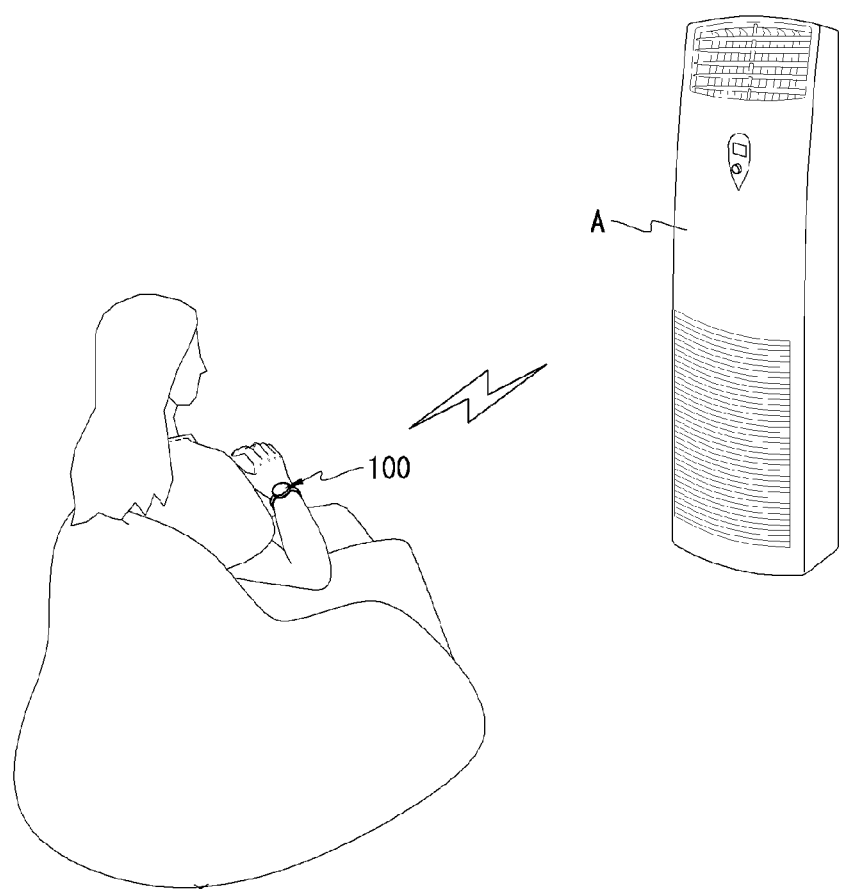

FIG. 35 shows an example of use of an electronic device according to an embodiment of the present invention. Referring to FIG. 35, the electronic device may adjust another electronic device. The other electronic device may be an air-conditioning system A. For example, the user may usually stay away from the air-conditioning system A. The user may wear or carry the electronic device. The user may change the temperature of the air-conditioning system A or adjust the blow strength. To that end, the user may make a temperature change or blow adjustment by turning around the rotor 100.

Figure 36:
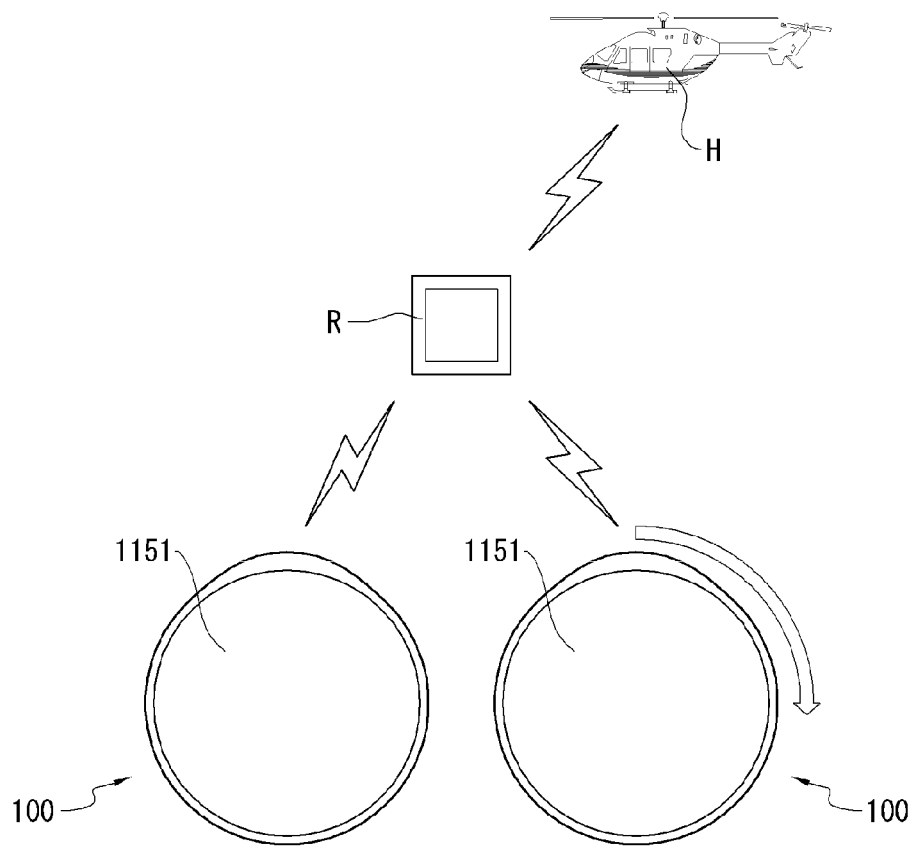

FIG. 36 shows an example of use of an electronic device according to an embodiment of the present invention. Referring to FIG. 36, a plurality of electronic devices may come in use. A plurality of electronic devices may be used in a system required to adjust a number of factors. For instance, two electronic devices may be used for a drone helicopter H requiring maneuver in upper, lower, left, and right directions. Of the two electronic devices, one may control the ascent and/or descent of the drone helicopter H by the rotation of the rotor 100, and the other may control left-right direction changes of the drone helicopter H by the rotation of the rotor 100. The electronic devices may interwork with a remote unit R for the drone helicopter H. To avoid confusion between the functions, the display units 1151 of the electronic devices may display the respective functions thereof.

Figure 37:
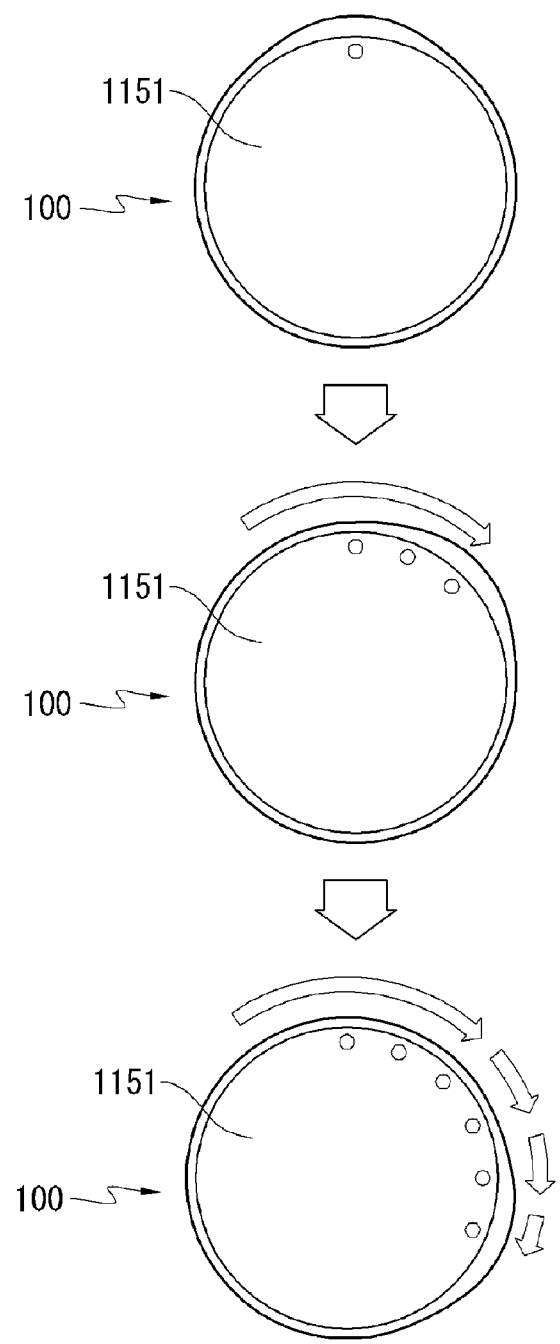

FIG. 37 shows an example of use of an electronic device according to an embodiment of the present invention. Referring to FIG. 37, the display unit 1151 of the electronic device may display the degree of rotation of the rotor 100. For example, the degree of rotation of the rotor 100 may be displayed as points, and as the rotor 100 rotates, the points may be activated along the outer periphery of the rotor 100, thereby displaying the degree of rotation of the rotor 100. Here, the points may be activated in the opposite direction of the rotational direction of the rotor 100. As an example, if the rotor 100 rotates clockwise, the points may be activated counterclockwise. Thus, the rotation of the rotor 100 may be visually shown to the user.

As set forth above, the mobile terminal, air-conditioning system, and display device that exchange information with the rotor 100 or the base 200 may be referred to as an external system. Further, the external system is not limited thereto and the external system may mean a system that may be adjusted by the rotor 100 and/or the base 200.

The uses of the electronic device according to the embodiments of the present invention described above are not limited thereto. According to an embodiment of the present invention, the electronic device may remotely control another electronic device, and thus, the use of the electronic device adjustable by the other electronic device in a remote site may be deemed to belong to the scope of the present invention.

The above-described invention may be implemented as computer-readable codes in a program-recorded medium. The computer-readable medium includes all types of recording devices storing data readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage, or anything implemented in the form of a carrier wave (e.g., transmissions through the Internet). Further, the computer may include the controller 1180 of the electronic device.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An electronic device, comprising:
a base forming an accommodation space;
a rotor being received in the accommodation space of the base, the rotor being rotatably coupled to the base;
a first magnetic body being installed in the rotor, the first magnetic body being positioned at a center of rotation of the rotor, the first magnetic body facing the base, and the first magnetic body having a first polarity;
a second magnetic body being installed in the base, the second magnetic body facing the first magnetic body, and the second magnetic body having a second polarity;
a first group of magnetic bodies being installed in the base, the first group of magnetic bodies being positioned around the second magnetic body;
a third magnetic body being installed in the rotor, the third magnetic body facing at least one of the first group of magnetic bodies, and the third magnetic body being positioned around the first magnetic body;
a hall sensor embedded in the rotor and sensing a change in magnetic field provided from the first group of magnetic bodies according to a rotation of the rotor;
a wireless communication unit embedded in the rotor or the base; and
a controller embedded in the rotor or the base and configured to transmit information obtained by the hall sensor through the wireless communication unit,
wherein the first polarity is different from the second polarity, and
wherein the first group of magnetic bodies includes:
a fourth magnetic body having a fourth polarity; and
a fifth magnetic body having a fifth polarity different from the fourth polarity.

2. The electronic device of claim 1, further comprising a second plurality of magnetic bodies positioned around the first magnetic body, facing at least two of the first group of magnetic bodies, and having the same polarity as at least one of the first group of magnetic bodies and a different polarity from at least another of the first group of magnetic bodies.

3. The electronic device of claim 1, wherein the rotor has a pebble shape, and the base has a shell shape having a concave surface,
wherein the concave surface forms the accommodation space, and
wherein the rotor is placed on the concave surface of the base.

4. The electronic device of claim 1, further comprising:
a rotational shaft externally extending from a part of the base, the rotational shaft facing the rotor; and
a rotational hole formed on the rotor facing the base,
wherein the rotational shaft fitted into the rotational hole.

5. The electronic device of claim 1, further comprising:
a rotational shaft externally extending from a part of the rotor, the rotational shaft facing the base; and
a rotational hole formed on the base facing the rotor,
wherein the rotational shaft is fitted into the rotational hole.

6. The electronic device of claim 5, wherein the first magnetic body is positioned at the rotational shaft, and the second magnetic body is positioned at the rotational hole.

7. The electronic device of claim 5, further comprising:
a sync extending from an end of the rotational shaft in an outside direction of a diameter of the rotational shaft and formed asymmetrically; and
a sync hole depressed from a periphery of an upper end of the rotational hole in an inside direction of a diameter of the rotational hole, the sync hole formed asymmetrically to match the sync.

8. The electronic device of claim 1, further comprising a sound unit embedded in the rotor,
wherein the sound unit includes a housing and a sounder provided in the housing and moved in the housing by a change in magnetic property of the first group of magnetic bodies according to the rotation of the rotor and having different magnetic properties.

9. The electronic device of claim 8, wherein the sounder includes a plurality of magnetic bodies having different polarities.

10. The electronic device of claim 8, wherein the sounder includes a first cube having a magnetic property and a second cube having a magnetic property different from the first cube, and
wherein the magnetic property is at least one of a polarity or a magnetic field.

11. The electronic device of claim 8, wherein the sounder includes a ball having a magnetic property and a cube having a magnetic property different from the ball, and
wherein the magnetic property is at least one of a polarity or a magnetic field.

12. The electronic device of claim 1, further comprising a sound unit embedded in the rotor,
wherein the sound unit includes a housing,
a sounder embedded in the housing, the sounder having a magnetic property, and the sounder being configured to move in the housing in accordance with a change in magnetic field of the first group of magnetic bodies according to the rotation of the rotor, and
a pivot lever,
wherein a side of the pivot lever is pivotally connected to the housing, and
wherein another side of the pivot lever is fixed to the sounder.

13. The electronic device of claim 1, further comprising:
a plurality of terminals being provided at a part of the rotor, the plurality of terminals facing the base; and
a terminal provided at a part of the base, the terminal facing the rotor, the terminal contacting at least one of the plurality of terminals according to the rotation of the rotor,
wherein the controller is configured to determine an external system connected to the wireless communication unit by information obtained from a terminal resistance of any one of the plurality of terminals.

14. The electronic device of claim 13, wherein the controller is configured to determine the external system connected to the wireless communication unit when a change in the terminal resistance of any one of the plurality of terminals lasts a predetermined time or more.

15. The electronic device of claim 1, further comprising a display unit being coupled to the rotor and forming a surface of the rotor.

16. The electronic device of claim 15, wherein the controller is configured to activate at least a portion of the display unit in accordance with the rotation of the rotor.

17. The electronic device of claim 15, wherein the controller is configured to display a dot or a line on the display unit in an opposite direction of a direction in which the rotor rotates.

18. The electronic device of claim 1, wherein the rotor includes an inner covered by the base and an outer exposed to an outside of the base, the outer having an asymmetrical shape.

19. The electronic device of claim 1, wherein the fourth magnetic body includes a plurality of parts being spaced apart from one another,
wherein the fifth magnetic body includes a plurality of parts being spaced apart from one another, and
wherein the plurality of parts of the fourth magnetic body are positioned alongside of a perimeter of the second magnetic body alternatively with the plurality of parts of the fifth magnetic body.

20. The electronic device of claim 1, wherein the plurality of parts of the fourth magnetic body includes a first part and a second part, the first part of the fourth magnetic body is positioned opposite to the second part of the fourth magnetic body with respect to the second magnetic body,
wherein the plurality of parts of the fifth magnetic body includes a first part and a second part, the first part of the fifth magnetic body is positioned opposite to the second part of the fifth magnetic body with respect to the second magnetic body, and
wherein the first part of the fourth magnetic body, the first part of the fifth magnetic body, the second part of the fourth magnetic body, and the second part of the fifth magnetic body are sequentially positioned alongside of a perimeter of the second magnetic body.

* * * * *